(12) United States Patent
Yamada

(10) Patent No.: US 11,826,983 B2
(45) Date of Patent: *Nov. 28, 2023

(54) POLYMER FILM AND LAMINATE

(71) Applicant: FUJIFILM Corporation, Tokyo (JP)

(72) Inventor: Akira Yamada, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/897,198

(22) Filed: Aug. 28, 2022

(65) Prior Publication Data

US 2023/0070617 A1 Mar. 9, 2023

(30) Foreign Application Priority Data

Aug. 31, 2021 (JP) ................. 2021-141202

(51) Int. Cl.
*B32B 15/085* (2006.01)
*B32B 15/20* (2006.01)
(Continued)

(52) U.S. Cl.
CPC ............ *B32B 15/085* (2013.01); *B32B 5/145* (2013.01); *B32B 5/18* (2013.01); *B32B 15/046* (2013.01);
(Continued)

(58) Field of Classification Search
CPC ... B32B 15/085; B32B 15/20; B32B 2250/40; B32B 2255/06; B32B 2262/101; B32B 2262/106; B32B 2264/0235; B32B 2264/025; B32B 2264/101; B32B 2264/1021; B32B 2264/1022;
(Continued)

(56) References Cited

U.S. PATENT DOCUMENTS

| 9,538,646 B2 | 1/2017 | Onodera et al. |
| 2014/0231123 A1* | 8/2014 | Onodera ............... C08J 5/18 |
| | | 174/255 |
| 2023/0078709 A1* | 3/2023 | Yamada .............. B32B 15/20 |
| | | 428/315.9 |

FOREIGN PATENT DOCUMENTS

JP 6640072 2/2020

* cited by examiner

*Primary Examiner* — Hai Vo
(74) *Attorney, Agent, or Firm* — JCIPRNET

(57) ABSTRACT

An object of the present invention is to provide a polymer film having a low dielectric loss tangent and a small difference in a linear expansion coefficient from that of a copper foil; and a laminate.

The polymer film of an embodiment of the present invention is a polymer film including a liquid crystal polymer, in which a hardness A at a distance of half of a thickness of the polymer film and a hardness B at a distance of $1/10$ of the thickness of the polymer film satisfy a relationship of Expression (1A), and in a case where positions at distances of $1/10$, $4/10$, and $6/10$ of the thickness of the polymer film are defined as a position T1, a position T2, and a position T3, respectively; and a region from the one surface to the position T1 is defined as a first surface layer region, and a region from the position T2 to the position T3 is defined as a central region, a void area proportion X in the first surface layer region and a void area proportion Y in the central region satisfy a relationship of Expression (2A).

(Hardness $A$+Hardness $B$)/2≥0.10 GPa    Expression (1A)

Void area proportion $Y$–Void area proportion $X$≥0.10%    Expression (2A)

8 Claims, 1 Drawing Sheet

(51) Int. Cl.
    *B32B 5/14*         (2006.01)
    *B32B 5/18*         (2006.01)
    *B32B 15/04*       (2006.01)
    *B32B 7/12*         (2006.01)
    *B32B 27/32*       (2006.01)

(52) U.S. Cl.
    CPC ............... *B32B 15/20* (2013.01); *B32B 7/12* (2013.01); *B32B 27/32* (2013.01); *B32B 2250/40* (2013.01); *B32B 2255/06* (2013.01); *B32B 2262/101* (2013.01); *B32B 2262/106* (2013.01); *B32B 2264/025* (2013.01); *B32B 2264/0235* (2013.01); *B32B 2264/101* (2013.01); *B32B 2264/104* (2013.01); *B32B 2264/105* (2013.01); *B32B 2264/108* (2013.01); *B32B 2264/1021* (2020.08); *B32B 2264/1022* (2020.08); *B32B 2264/1023* (2020.08); *B32B 2264/1024* (2020.08); *B32B 2270/00* (2013.01); *B32B 2307/204* (2013.01); *B32B 2307/536* (2013.01); *B32B 2307/732* (2013.01); *B32B 2457/08* (2013.01)

(58) Field of Classification Search
    CPC .... B32B 2264/1023; B32B 2264/1024; B32B 2264/104; B32B 2264/105; B32B 2264/108; B32B 2270/00; B32B 2307/204; B32B 2307/536; B32B 2307/732; B32B 2457/08; B32B 27/32; B32B 7/12
    See application file for complete search history.

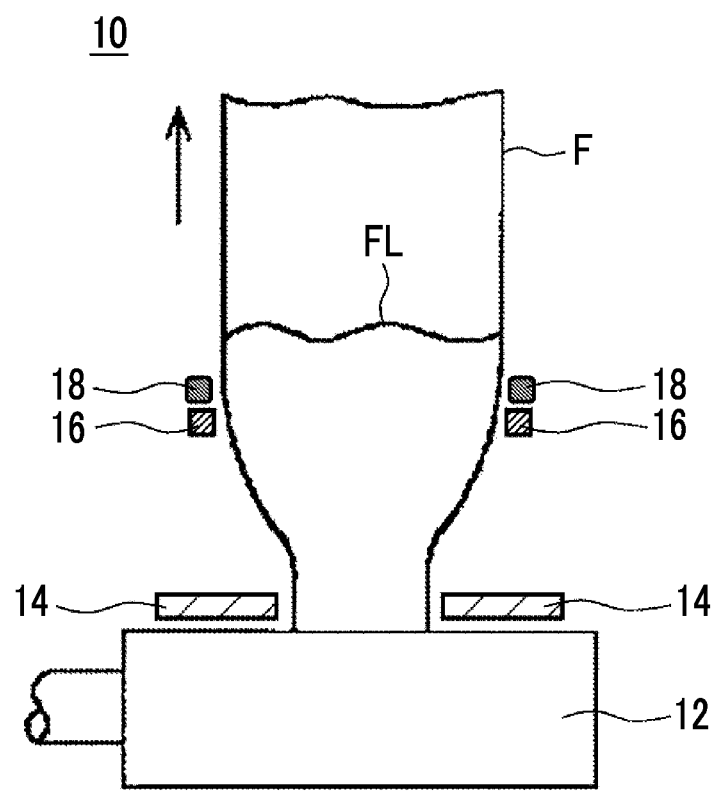

POLYMER FILM AND LAMINATE

CROSS-REFERENCE TO RELATED APPLICATIONS

The present application claims priority under 35 U.S.C. § 119 to Japanese Patent Application No. 2021-141202, filed on Aug. 31, 2021. The above application is hereby expressly incorporated by reference, in its entirety, into the present application.

BACKGROUND OF THE INVENTION

1. Field of the Invention

The present invention relates to a polymer film and a laminate.

2. Description of the Related Art

Higher frequency bands than ever before have been used in a 5th generation (5G) mobile communication system, which is considered to be next-generation communication technology. Therefore, a film substrate for a circuit board for the 5G mobile communication system is required to have a low dielectric loss tangent and a low water absorption from the viewpoint of reducing a transmission loss in a high frequency band, and development of film substrates using various materials is in progress.

For example, JP6640072B describes a liquid crystal polymer film consisting of a thermoplastic polymer capable of forming an optically anisotropic molten phase, in which a change rate of relative dielectric constants before and after heating the film satisfies a specific relationship; and a laminate provided with a film layer consisting of a thermoplastic liquid crystal polymer film and a metal layer.

SUMMARY OF THE INVENTION

As described above, there is a demand for a polymer film having a low dielectric loss tangent. Here, a hardness of the polymer film is related to the dielectric loss tangent, and a polymer film having a high hardness may be used in order to provide the polymer film with a low dielectric loss tangent.

However, in a case where a laminate is produced by subjecting a high hardness polymer film and a copper foil to thermocompression, the obtained laminate may be warped, or the polymer film and the copper foil may be peeled. As one of the methods for solving this problem, a method using a polymer film having a small difference in linear expansion coefficient from that of a copper foil may be mentioned.

In a case where the present inventors evaluated a polymer film as described in JP6640072B, it was clarified that although the polymer film had a low dielectric loss tangent, the difference in linear expansion coefficient from that of the copper foil is increased, and there was room for improvement.

Therefore, an object of the present invention is to provide a polymer film having a low dielectric loss tangent and a small difference in a linear expansion coefficient from that of a copper foil.

In addition, another object of the present invention is to provide a laminate having the polymer film and a metal-containing layer.

The present inventors have conducted intensive studies to solve the problems, and as a result, they have found that in a case where a hardness at a specific position in the thickness direction satisfies a predetermined relationship and a void area proportion in a specific region in the thickness direction satisfies a predetermined relationship in a polymer film, the dielectric loss tangent is low and the difference in a linear expansion coefficient from the copper foil decreases, thereby completing the present invention.

That is, the present inventors have found that the objects can be accomplished by the following configurations.

[1] A polymer film comprising a liquid crystal polymer, in which in a case where a hardness at a position A at a distance of half of a thickness of the polymer film from one surface toward the other surface of the polymer film is defined as a hardness A and a hardness at a position B at a distance of $1/10$ of the thickness of the polymer film from the one surface toward the other surface of the polymer film is defined as a hardness B in a cross-section along a thickness direction of the polymer film, the hardness A and the hardness B satisfy a relationship of Expression (1A), and in a case where a position at a distance of $1/10$ of the thickness of the polymer film is defined as a position T1, a position at a distance of $4/10$ of the thickness of the polymer film is defined as a position T2, and a position at a distance of $6/10$ of the thickness of the polymer film is defined as a position T3, from the one surface toward the other surface of the polymer film in the cross-section; a region from the one surface to the position T1 is defined as a first surface layer region, and a region from the position T2 to the position T3 is defined as a central region; and a void area proportion in the first surface layer region is defined as a void area proportion X, and a void area proportion in the central region is a void area proportion Y, the void area proportion X and the void area proportion Y satisfy a relationship of Expression (2A), (Hardness $A$+Hardness $B$)/2≥0.10 GPa    Expression (1A)

Void area proportion $Y$−Void area proportion $X$≥0.10%.    Expression (2A)

[2] The polymer film as described in [1],
in which the hardness A and the hardness B satisfy a relationship of Expression (1B), (Hardness $A$−Hardness $B$)≥−0.02 GPa.    Expression (1B)

[3] The polymer film as described in [1] or [2],
in which the polymer film has a monolayer structure.
[4] The polymer film as described in any one of [1] to [3],
in which the polymer film has a dielectric loss tangent of 0.0024 or less at a temperature of 23° C. and a frequency of 28 GHz.
[5] The polymer film as described in any one of [1] to [4],
in which the liquid crystal polymer has at least one selected from the group consisting of a repeating unit derived from parahydroxybenzoic acid and a repeating unit derived from 6-hydroxy-2-naphthoic acid.
[6] A laminate comprising:
the polymer film as described in any one of [1] to [5]; and
at least one metal-containing layer.
[7] The laminate as described in [6],
in which the laminate has at least two of the metal-containing layers, and
the metal-containing layer, the polymer film, and the metal-containing layer are arranged in this order.

[8] The laminate as described in [6] or [7],
in which the metal-containing layer has a thickness of 5 to 30 μm.

According to the present invention, it is possible to provide a polymer film having a low dielectric loss tangent and a small difference in a linear expansion coefficient from that of a copper foil; and a laminate including the same.

BRIEF DESCRIPTION OF THE DRAWINGS

FIG. 1 is a cross-sectional view showing an example of the configuration of a production device used for producing a polymer film by inflation molding.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

In the present specification, in a case where the polymer film or the laminate has an elongated shape, a length direction means a longitudinal direction and a machine direction (MD) of the polymer film or the laminate, and a width direction means a direction (a lateral direction and a transverse direction (TD)) perpendicular to the length direction in a plane of the polymer film or the laminate.

In the present specification, for each component, one kind of substance corresponding to each component may be used alone, or two or more kinds thereof may be used in combination. Here, in a case where two or more kinds of substances are used for each component, the content of the component indicates a total content of two or more substances unless otherwise specified.

In the present specification, "to" is used in a meaning including numerical values denoted before and after "to" as a lower limit value and an upper limit value, respectively.

In the present specification, the dielectric loss tangent of the polymer film or the liquid crystal polymer included in the polymer film as measured under the conditions of a temperature of 23° C. and a frequency of 28 GHz is also described as a "standard dielectric loss tangent".

Polymer Film

The polymer film of the embodiment of the present invention includes a liquid crystal polymer. Moreover, a hardness at a position A at a distance of half of a thickness of the polymer film from one surface toward the other surface of the polymer film is defined as a hardness A and a hardness at a position B at a distance of 1/10 of the thickness of the polymer film from the one surface toward the other surface of the polymer film is defined as a hardness B, the hardness A and the hardness B satisfy a relationship of Expression (1A). In addition, in a case where a position at a distance of 1/10 of the thickness of the polymer film is defined as a position T1, a position at a distance of 4/10 of the thickness of the polymer film is defined as a position T2, and a position at a distance of 6/10 of the thickness of the polymer film is defined as a position T3, from the one surface toward the other surface of the polymer film in the cross-section; a region from the one surface to the position T1 is defined as a first surface layer region, and a region from the position T2 to the position T3 is defined as a central region; and a void area proportion in the first surface layer region is defined as a void area proportion X, and a void area proportion in the central region is a void area proportion Y, the void area proportion X and the void area proportion Y satisfy a relationship of Expression (2A).

$$(\text{Hardness } A+\text{Hardness } B)/2 \geq 0.10 \text{ GPa} \qquad \text{Expression (1A)}$$

$$\text{Void area proportion } Y-\text{Void area proportion } X \geq 0.10\%. \qquad \text{Expression (2A)}$$

The polymer film of the embodiment of the present invention has a low dielectric loss tangent and a small difference in a linear expansion coefficient from that of a copper foil. Details of a reason thereof are not clear, but are usually presumed to be as follows.

A polymer film having a high hardness tends to exhibit a lower standard dielectric loss tangent. Here, Expression (1A) indicates a relationship between the hardness in the central part of the thickness of the polymer film and the hardness in the surface layer part, and since the polymer film satisfying Expression (1A) can be said to have a high hardness of the entire film, it is presumed that the polymer film shows a low standard dielectric loss tangent.

Here, in a case where the polymer film is used in the production of a circuit board, it is used in the form of a laminate having the polymer film and a copper foil. In this case, a high hardness of the polymer film causes a warpage of the laminate, a reduction in the adhesiveness between the polymer film and the copper foil, and the like upon heating the laminate.

As one of the methods for solving this problem, a method in which a difference in linear expansion coefficients between the polymer film and the copper foil is decreased may be mentioned. The present inventors have found that the difference in the linear expansion coefficient of the polymer film from that of the copper foil can be decreased by using a polymer film which satisfies Expression (2A) as well as Expression (1A).

Expression (2A) indicates a relationship between the void area proportion in the surface layer part of the polymer film and the void area proportion in the central part of the thickness of the polymer film. A reason therefor is not clear, but it is considered that a polymer film having the void area proportions satisfying the relationship of Expression (2A) is controlled in stretching in the thickness direction and suppressed in expansion in the in-plane direction. As a result, it is presumed that even in a case where a polymer film having a high hardness, satisfying Expression (1A), is used, a difference in the linear expansion coefficient from that of a copper foil is remarkably decreased by satisfying Expression (2A).

Hardness

For the polymer film of the embodiment of the present invention, in a case where a hardness at a position A at a distance of half of a thickness of the polymer film from one surface toward the other surface of the polymer film is defined as a hardness A and a hardness at a position B at a distance of 1/10 of the thickness of the polymer film from one surface toward the other surface of the polymer film is defined as a hardness B in a cross-section along a thickness direction of the polymer film, the hardness A and the hardness B satisfy a relationship of Expression (1A).

$$(\text{Hardness } A+\text{Hardness } B)/2 \geq 0.10 \text{ GPa} \qquad \text{Expression (1A)}$$

The lower limit of "(Hardness A+Hardness B)/2" in Expression (1A) is preferably 0.12 GPa or more, more preferably 0.14 GPa or more, and still more preferably 0.16 GPa or more from the viewpoint that the effect of the present invention is more excellent.

The upper limit of "(Hardness A+Hardness B)/2" in Expression (1A) is preferably 0.30 GPa or less, more preferably 0.25 GPa or less, and still more preferably 0.20 GPa or less from the viewpoint that the effect of the present invention is more excellent.

It is preferable that the hardness A and the hardness B further satisfy a relationship of Expression (1B) from the viewpoint that the effect of the present invention is more excellent.

(Hardness $A$−Hardness $B$)≥−0.02 GPa  Expression (1B)

The lower limit of "(Hardness A−Hardness B)" in Expression (1B) is preferably −0.01 GPa or more, and more preferably 0.00 GPa or more from the viewpoint that the effect of the present invention is more excellent.

The upper limit of "(Hardness A−Hardness B)" in Expression (1B) is preferably 0.06 GPa or less, more preferably 0.04 GPa or less, and still more preferably 0.02 GPa or less from the viewpoint that the effect of the present invention is more excellent.

The hardness A is preferably 0.10 to 0.25 GPa, and more preferably 0.12 to 0.20 GPa from the viewpoint that the effect of the present invention is more excellent.

The hardness B is preferably 0.12 to 0.30 GPa, and more preferably 0.14 to 0.25 GPa from the viewpoint that the effect of the present invention is more excellent.

The hardness in a cross-section of the polymer film is an indentation hardness measured using a nanoindenter according to ISO14577, and a specific measuring method therefor will be described in Examples which will be described later.

In addition, the value of "(Hardness A+Hardness B)/2" in the polymer film can be adjusted by, for example, carrying out a specific heat treatment which will be described later in a film forming step for the polymer film and controlling an amount of heat (temperature×time) related to an annealing treatment which will be described later.

Moreover, the value of "(Hardness A−Hardness B)" in the polymer film can be adjusted by, for example, carrying out the specific heat treatment which will be described later in a film forming step for the polymer film and controlling an amount of heat according to the thickness direction of the polymer film in the annealing treatment which will be described later.

Void Area Proportion

For the polymer film of the embodiment of the present invention, in a case where a position at a distance of 1/10 of the thickness of the polymer film is defined as a position T1, a position at a distance of 4/10 of the thickness of the polymer film is defined as a position T2, and a position at a distance of 6/10 of the thickness of the polymer film is defined as a position T3, from one surface toward the other surface of the polymer film in a cross-section along the thickness direction of the polymer film; a region from the one surface to the position T1 is defined as a first surface layer region, and a region from the position T2 to the position T3 is defined as a central region; and a void area proportion in the first surface layer region is defined as a void area proportion X, and a void area proportion in the central region is a void area proportion Y, the void area proportion X and the void area proportion Y satisfy a relationship of Expression (2A).

Void area proportion $Y$−Void area proportion $X$≥0.10%.  Expression (2A)

The lower limit of the "Void area proportion Y−Void area proportion X" in Expression (2A) is preferably 0.20% or more, and more preferably 0.30% or more from the viewpoint that the effect of the present invention is more excellent.

The upper limit of the "Void area proportion Y−Void area proportion X" in Expression (2A) is preferably 0.70% or less, more preferably 0.60% or less, and still more preferably 0.50% or less from the viewpoint that the effect of the present invention is more excellent.

The void area proportion X is preferably 8% to 20%, and more preferably 10% to 18% from the viewpoint that the effect of the present invention is more excellent.

The void area proportion Y is preferably 10% to 22%, and more preferably 12% to 20% from the viewpoint that the effect of the present invention is more excellent.

The void area proportion in each region of the cross-section of the polymer film means a proportion (%) of the area of a void in each region with respect to the area of each region in the cross-section of the polymer film. The void area proportion can be determined as follows: the polymer film cut so that a cross-section in the thickness direction has been exposed is immersed in propylamine, then the cross-section of the polymer film is imaged with a scanning electron microscope (SEM), and the captured image is subjected to image processing with image processing software (ImageJ) to obtain data, and the void area proportion can be determined based on the data. A specific measurement method therefor will be described in Examples which will be described later.

In addition, the values of the void area proportion (the void area proportions X and Y) and the "Void area proportion Y−Void area proportion X" in the polymer film can be adjusted by, for example, carrying out a specific heat treatment which will be described later in a film forming step for the polymer film, controlling an amount of heat (temperature×time) in an annealing treatment which will be described later, and controlling an amount of heat applied to the annealing treatment which will be described later in the thickness direction of the polymer film.

Components

Hereinafter, the components included in the polymer film will be described in detail.

Liquid Crystal Polymer

A liquid crystal polymer included in the polymer film of the embodiment of the present invention is not particularly limited, and examples thereof include a liquid crystal polymer which can be melt-molded.

As the liquid crystal polymer, a thermotropic liquid crystal polymer is preferable. The thermotropic liquid crystal polymer means a polymer which exhibits liquid crystallinity in a molten state in case of heating it in a predetermined temperature range.

The thermotropic liquid crystal polymer is not particularly limited in terms of the chemical composition as long as it is a melt-moldable liquid crystal polymer, and examples thereof include a thermoplastic liquid crystal polyester and a thermoplastic polyester amide with an amide bond introduced into the thermoplastic liquid crystal polyester.

As the liquid crystal polymer, for example, the thermoplastic liquid crystal polymer described in WO2015/064437A and JP2019-116586A can be used.

More specific examples of the liquid crystal polymer include a thermoplastic liquid crystal polyester or thermoplastic liquid crystal polyester amide having a repeating unit derived from at least one selected from the group consisting of an aromatic hydroxycarboxylic acid, an aromatic or aliphatic diol, an aromatic or aliphatic dicarboxylic acid, an aromatic diamine, an aromatic hydroxyamine, and an aromatic aminocarboxylic acid.

Examples of the aromatic hydroxycarboxylic acid include parahydroxybenzoic acid, metahydroxybenzoic acid, 6-hydroxy-2-naphthoic acid, and 4-(4-hydroxyphenyl)benzoic acid. These compounds may have substituents such as a halogen atom, a lower alkyl group, and a phenyl group. Among these, the parahydroxybenzoic acid or the 6-hydroxy-2-naphthoic acid is preferable.

As the aromatic or aliphatic diol, the aromatic diol is preferable. Examples of the aromatic diol include hydroquinone, 4,4'-dihydroxybiphenyl, 3,3'-dimethyl-1,1'-biphenyl-4,4'-diol, and acylated products thereof, and hydroquinone or 4,4'-dihydroxybiphenyl is preferable.

As the aromatic or aliphatic dicarboxylic acid, the aromatic dicarboxylic acid is preferable. Examples of the aromatic dicarboxylic acid include terephthalic acid, isophthalic acid, and 2,6-naphthalenedicarboxylic acid, and terephthalic acid is preferable.

Examples of the aromatic diamine, the aromatic hydroxyamine, and the aromatic aminocarboxylic acid include p-phenylenediamine, 4-aminophenol, and 4-aminobenzoic acid.

In addition, it is preferable that the liquid crystal polymer has at least one selected from the group consisting of the repeating units represented by Formulae (1) to (3).

—O-Ar1-CO—            (1)

—CO-Ar2-CO—          (2)

—X-Ar3-Y—             (3)

In Formula (1), Ar1 represents a phenylene group, a naphthylene group, or a biphenylylene group.

In Formula (2), Ar2 represents a phenylene group, a naphthylene group, a biphenylylene group, or a group represented by Formula (4).

In Formula (3), Ar3 represents a phenylene group, a naphthylene group, a biphenylylene group, or the group represented by Formula (4), and X and Y each independently represent an oxygen atom or an imino group.

-Ar4-Z-Ar5-             (4)

In Formula (4), Ar4 and Ar5 each independently represent a phenylene group or a naphthylene group, and Z represents an oxygen atom, a sulfur atom, a carbonyl group, a sulfonyl group, or an alkylene group.

The phenylene group, the naphthylene group, and the biphenylylene group may have a substituent selected from the group consisting of a halogen atom, an alkyl group, and an aryl group.

Among those, the liquid crystal polymer preferably has at least one selected from the group consisting of the repeating unit derived from an aromatic hydroxycarboxylic acid represented by Formula (1), the repeating unit derived from an aromatic diol represented by Formula (3), in which both X and Y are oxygen atoms, and the repeating unit derived from an aromatic dicarboxylic acid represented by Formula (2).

In addition, the liquid crystal polymer more preferably has at least a repeating unit derived from an aromatic hydroxycarboxylic acid, still more preferably has at least one selected from the group consisting of the repeating unit derived from parahydroxybenzoic acid and the repeating unit derived from 6-hydroxy-2-naphthoic acid, and particularly preferably has the repeating unit derived from parahydroxybenzoic acid and the repeating unit derived from 6-hydroxy-2-naphthoic acid.

In addition, as another preferred aspect from the viewpoint that the effect of the present invention is more excellent, the liquid crystal polymer preferably has at least one selected from the group consisting of the repeating unit derived from 6-hydroxy-2-naphthoic acid, the repeating unit derived from an aromatic diol, the repeating unit derived from terephthalic acid, and the repeating unit derived from a 2,6-naphthalenedicarboxylic acid, and more preferably has all of the repeating unit derived from 6-hydroxy-2-naphthoic acid, the repeating unit derived from an aromatic diol, the repeating unit derived from terephthalic acid, and the repeating unit derived from 2,6-naphthalenedicarboxylic acid.

In a case where the liquid crystal polymer includes the repeating unit derived from an aromatic hydroxycarboxylic acid, a compositional ratio thereof is preferably 50% to 65% by mole with respect to all the repeating units of the liquid crystal polymer. In addition, it is also preferable that the liquid crystal polymer has only the repeating unit derived from an aromatic hydroxycarboxylic acid.

In a case where the liquid crystal polymer includes the repeating unit derived from an aromatic diol, a compositional ratio thereof is preferably 17.5% to 25% by mole with respect to all the repeating units of the liquid crystal polymer.

In a case where the liquid crystal polymer includes the repeating unit derived from an aromatic dicarboxylic acid, a compositional ratio thereof is preferably 11% to 23% by mole with respect to all the repeating units of the liquid crystal polymer.

In a case where the liquid crystal polymer includes the repeating unit derived from any of an aromatic diamine, an aromatic hydroxyamine, and an aromatic aminocarboxylic acid, a compositional ratio thereof is preferably 2% to 8% by mole with respect to all the repeating units of the liquid crystal polymer.

A method for synthesizing the liquid crystal polymer is not particularly limited, and the compound can be synthesized by polymerizing the compound by a known method such as melt polymerization, solid phase polymerization, solution polymerization, and slurry polymerization.

As the liquid crystal polymer, a commercially available product may be used. Examples of the commercially available product of the liquid crystal polymer include "LAPEROS" manufactured by Polyplastics Co., Ltd., "VECTRA" manufactured by Celanese Corporation, "UENO LCP" manufactured by Ueno Fine Chemicals Industry, Ltd., "SUMIKA SUPER LCP" manufactured by Sumitomo Chemical Company, "Xydar" manufactured by ENEOS LC Co., Ltd., and "Siveras" manufactured by Toray Industries, Inc.

Furthermore, the liquid crystal polymer may form a chemical bond in the polymer film with a crosslinking agent, a compatible component (reactive compatibilizer), or the like which is an optional component. The same applies to components other than the liquid crystal polymer.

The standard dielectric loss tangent of the liquid crystal polymer is preferably 0.0022 or less, more preferably 0.0015 or less, and still more preferably 0.0010 or less from the viewpoint that a polymer film having a low standard dielectric loss tangent (preferably a standard dielectric loss tangent of 0.0025 or less) can be easily produced. The lower limit value is not particularly limited, and may be, for example, 0.0001 or more.

In a case where the polymer film includes two or more kinds of liquid crystal polymers, the "dielectric loss tangent of the liquid crystal polymer" means a mass-average value of the dielectric loss tangents of two or more kinds of liquid crystal polymers.

The standard dielectric loss tangent of the liquid crystal polymer included in the polymer film can be measured by the following method.

First, after performing immersion in an organic solvent (for example, pentafluorophenol) in an amount of 1,000 times by mass with respect to the total mass of the polymer film, the mixture is heated at 120° C. for 12 hours to elute the organic solvent-soluble components including the liquid crystal polymer into the organic solvent. Next, the eluate including the liquid crystal polymer and the non-eluted components are separated by filtration. Subsequently, acetone is added to the eluate as a poor solvent to precipitate a liquid crystal polymer, and the precipitate is separated by filtration.

A standard dielectric loss tangent of the liquid crystal polymer can be obtained by filling a polytetrafluoroethylene (PTFE) tube (outer diameter: 2.5 mm, inner diameter: 1.5 mm, length 10 mm) with the obtained precipitate, measuring the dielectric characteristics by a cavity resonator perturbation method under the conditions of a temperature of 23° C. and a frequency of 28 GHz, using a cavity resonator (for example, "CP-531" manufactured by Kanto Electronics Application & Development, Inc.), and correcting the influence of voids in the PTFE tube by a Bruggeman equation and a void ratio.

The void ratio (volume fraction of the void in the tube) is calculated as follows. The volume of a space inside the tube is determined from the inner diameter and the length of the tube. Next, the weights of the tube before and after filling the precipitate are measured to determine the mass of the filled precipitate, and then the volume of the filled precipitate is determined from the obtained mass and the specific density of the precipitate. The void ratio can be calculated by dividing the volume of the precipitate thus obtained by the volume of the space in the tube determined above to calculate a filling rate.

Furthermore, in a case where a commercially available product of the liquid crystal polymer is used, a numerical value of the dielectric loss tangent described as a catalog value of the commercially available product may be used.

As for the liquid crystal polymer, the melting point Tm is preferably 250° C. or higher, more preferably 280° C. or higher, and still more preferably 310° C. or higher from the viewpoint that the heat resistance is more excellent.

The upper limit value of the melting point Tm of the liquid crystal polymer is not particularly limited, but is preferably 400° C. or lower, and more preferably 380° C. or lower from the viewpoint that the moldability is more excellent.

The melting point Tm of the liquid crystal polymer can be determined by measuring a temperature at which the endothermic peak appears, using a differential scanning calorimeter ("DSC-60A" manufactured by Shimadzu Corporation). In a case where a commercially available product of the liquid crystal polymer is used, the melting point Tm described as the catalog value of the commercially available product may be used.

A number-average molecular weight (Mn) of the liquid crystal polymer is not particularly limited, but is preferably 10,000 to 600,000, and more preferably 30,000 to 150,000.

The number-average molecular weight of the liquid crystal polymer is a conversion value of standard polystyrene by gel permeation chromatography (GPC).

The measurement of GPC can be carried out with the following device and conditions.

"HLC (registered trademark)-8320GPC" manufactured by Tosoh Corporation is used as a measuring device, and two TSKgel (registered trademark) SuperHM-H (6.0 mm ID×15 cm, manufactured by Tosoh Corporation) are used as a column. A solvent (eluent) for dissolving the liquid crystal polymer is not particularly limited, and examples thereof include a mixed solution of pentafluorophenol/chloroform=1/2 (mass ratio). The measurement conditions are as follows: a sample concentration of 0.03% by mass, a flow rate of 0.6 ml/min, a sample injection amount of 20 μL, and a measurement temperature of 40° C. Detection is performed using an RI (differential refractometer) detector.

The calibration curve was created using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

The polymer film may include one kind of liquid crystal polymer alone, or may include two or more kinds of liquid crystal polymers.

A content of the liquid crystal polymer is preferably 40% to 99.9% by mass, more preferably 50% to 95% by mass, and still more preferably 60% to 90% by mass with respect to the total mass of the polymer film.

Furthermore, the content of the liquid crystal polymer and the components which will be described later in the polymer film can be measured by a known method such as infrared spectroscopy and gas chromatography mass spectrometry.

Optional Components

The polymer film may include optional components other than the polymer. Examples of the optional components include a polyolefin, compatible components, a heat stabilizer, and additives which will be described below.

Polyolefin

The polymer film may include a polyolefin.

In the present specification, the "polyolefin" is intended to be a polymer (a polyolefin resin) having a repeating unit derived from an olefin.

The polymer film preferably includes the liquid crystal polymer and the polyolefin, and more preferably includes the liquid crystal polymer, the polyolefin, and the compatible component.

The polyolefin may be linear or branched. In addition, the polyolefin may have a cyclic structure such as a polycycloolefin.

Examples of the polyolefin include polyethylene, polypropylene (PP), polymethylpentene (TPX and the like manufactured by Mitsui Chemicals, Inc.), hydrogenated polybutadiene, a cycloolefin polymer (COP, Zeonormanufactured by ZEON Corporation, and the like), and a cycloolefin copolymer (COC, APEL manufactured by Mitsui Chemicals, Inc., and the like).

The polyethylene may be either high density polyethylene (HDPE) or low density polyethylene (LDPE). In addition, the polyethylene may be linear low density polyethylene (LLDPE).

The polyolefin may be a copolymer of an olefin and a copolymerization component other than the olefin, such as acrylate, methacrylate, styrene, and/or a vinyl acetate-based monomer.

Examples of the polyolefin as the copolymer include a styrene-ethylene/butylene-styrene copolymer (SEBS). SEBS may be hydrogenated.

However, from the viewpoint that the effect of the present invention is more excellent, it is preferable that a copolymerization ratio of the copolymerization component other than the olefin is small, and it is more preferable that the copolymerization component is not included. For example, a content of the copolymerization component is preferably 0% to 40% by mass, and more preferably 0% to 5% by mass with respect to the total mass of the polyolefin.

In addition, the polyolefin is preferably substantially free of a reactive group which will be described below, and a content of the repeating unit having the reactive group is preferably 0% to 3% by mass with respect to the total mass of the polyolefin.

As the polyolefin, polyethylene, COP, or COC is preferable, polyethylene is more preferable, and the low-density polyethylene (LDPE) is still more preferable.

The polyolefins may be used alone or in combination of two or more kinds thereof.

In a case where the polymer film includes a polyolefin, a content thereof is preferably 0.1% by mass or more, and more preferably 5% by mass or more with respect to the total mass of the polymer film from the viewpoint that the surface property of the polymer film is more excellent. The upper limit is not particularly limited, but is preferably 50% by mass or less, more preferably 40% by mass or less, and still more preferably 25% by mass or less with respect to the total mass of the polymer film from the viewpoint that the smoothness of the polymer film is more excellent. In addition, in a case where the content of the polyolefin is 50% by mass or less, a thermal deformation temperature thereof can be easily raised sufficiently and the solder heat resistance can be improved.

Compatible Components

Examples of the compatible component include a polymer (non-reactive compatibilizer) having a moiety having high compatibility or affinity with the liquid crystal polymer and a polymer (reactive compatibilizer) having a reactive group for a phenolic hydroxyl group or a carboxyl group at the terminal of the liquid crystal polymer.

As the reactive group included in the reactive compatibilizer, an epoxy group or a maleic anhydride group is preferable.

As the compatible component, a copolymer having a moiety having a high compatibility or a high affinity with the polyolefin is preferable. In addition, in a case where the polymer film includes a polyolefin and a compatible component, a reactive compatibilizer is preferable as the compatible component from the viewpoint that the polyolefin can be finely dispersed.

Furthermore, the compatible component (in particular, the reactive compatibilizer) may form a chemical bond with a component such as a liquid crystal polymer in the polymer film.

Examples of the reactive compatibilizer include an epoxy group-containing polyolefin-based copolymer, an epoxy group-containing vinyl-based copolymer, a maleic anhydride-containing polyolefin-based copolymer, a maleic anhydride-containing vinyl copolymer, an oxazoline group-containing polyolefin-based copolymer, an oxazoline group-containing vinyl-based copolymer, and a carboxyl group-containing olefin-based copolymer. Among these, the epoxy group-containing polyolefin-based copolymer or the maleic anhydride-grafted polyolefin-based copolymer is preferable.

Examples of the epoxy group-containing polyolefin-based copolymer include an ethylene/glycidyl methacrylate copolymer, an ethylene/glycidyl methacrylate/vinyl acetate copolymer, an ethylene/glycidyl methacrylate/methyl acrylate copolymer, a polystyrene graft copolymer to an ethylene/glycidyl methacrylate copolymer (EGMA-g-PS), a polymethylmethacrylate graft copolymer to an ethylene/glycidyl methacrylate copolymer (EGMA-g-PMMA), and an acrylonitrile/styrene graft copolymer to an ethylene/glycidyl methacrylate copolymer (EGMA-g-AS).

Examples of a commercially available product of the epoxy group-containing polyolefin-based copolymer include Bondfast 2C and Bondfast E manufactured by Sumitomo Chemical Company; Lotadar manufactured by Arkema S.A.; and Modiper A4100 and Modiper A4400 manufactured by NOF Corporation.

Examples of the epoxy group-containing vinyl-based copolymer include a glycidyl methacrylate grafted polystyrene (PS-g-GMA), a glycidyl methacrylate grafted polymethyl methacrylate (PMMA-g-GMA), and a glycidyl methacrylate grafted polyacrylonitrile (PAN-g-GMA).

Examples of the maleic anhydride-containing polyolefin-based copolymer include a maleic anhydride grafted polypropylene (PP-g-MAH), a maleic anhydride grafted ethylene/propylene rubber (EPR-g-MAH), and a maleic anhydride grafted ethylene/propylene/diene rubber (EPDM-g-MAH).

Examples of a commercially available product of the maleic anhydride-containing polyolefin-based copolymer include Orevac G series manufactured by Arkema S.A.; and FUSABOND E series manufactured by The Dow Chemical Company.

Examples of the maleic anhydride-containing vinyl copolymer include a maleic anhydride grafted polystyrene (PS-g-MAH), a maleic anhydride grafted styrene/butadiene/styrene copolymer (SBS-g-MAH), a maleic anhydride grafted styrene/ethylene/butene/styrene copolymer (SEBS-g-MAH and a styrene/maleic anhydride copolymer, and an acrylic acid ester/maleic anhydride copolymer.

Examples of a commercially available product of the maleic anhydride-containing vinyl copolymer include TUFTEC M Series (SEBS-g-MAH) manufactured by Asahi Kasei Corporation.

In addition to those, examples of the compatible component include oxazoline-based compatibilizers (for example, a bisoxazoline-styrene-maleic anhydride copolymer, a bisoxazoline-maleic anhydride-modified polyethylene, and a bisoxazoline-maleic anhydride-modified polypropylene), elastomer-based compatibilizers (for example, an aromatic resin and a petroleum resin), and ethylene glycidyl methacrylate copolymer, an ethylene maleic anhydride ethyl acrylate copolymer, ethylene glycidyl methacrylate-acrylonitrile styrene, acid-modified polyethylene wax, a COOH-modified polyethylene graft polymer, a COOH-modified polypropylene graft polymer, a polyethylene-polyamide graft copolymer, a polypropylene-polyamide graft copolymer, a methyl methacrylate-butadiene-styrene copolymer, acrylonitrile-butadiene rubber, an EVA-PVC-graft copolymer, a vinyl acetate-ethylene copolymer, an ethylene-α-olefin copolymer, a propylene-α-olefin copolymer, a hydrogenated styrene-isopropylene-block copolymer, and an amine-modified styrene-ethylene-butene-styrene copolymer.

In addition, as the compatible component, an ionomer resin may be used.

Examples of such an ionomer resin include an ethylene-methacrylic acid copolymer ionomer, an ethylene-acrylic acid copolymer ionomer, a propylene-methacrylic acid copolymer ionomer, a butylene-acrylic acid copolymer ionomer, a propylene-acrylic acid copolymer ionomer, an ethylene-vinyl sulfonic acid copolymer ionomer, a styrene-methacrylic acid copolymer ionomer, a sulfonated polystyrene ionomer, a fluorine-based ionomer, a telechelic polybutadiene acrylic acid ionomer, a sulfonated ethylene-propylene-diene copolymer ionomer, hydrogenated polypentamer ionomer, a polypentamer ionomer, a poly(vinylpyridium salt) ionomer, a poly(vinyltrimethylammonium salt) ionomer, a poly(vinyl benzyl phosphonium salt) ionomer, a styrene-butadiene acrylic acid copolymer ionomer, a polyurethane ionomer, a sulfonated styrene-2-acrylamide-2-methyl propane sulfate ionomer, an acid-amine Ionomer, an aliphatic ionene, and an aromatic ionene.

In a case where the polymer film includes the compatible component, a content thereof is preferably 0.05% to 30% by mass, more preferably 0.1% to 20% by mass, and still more preferably 0.5% to 10% by mass with respect to the total mass of the polymer film.

Heat Stabilizer

The polymer film may include a heat stabilizer for the purpose of suppressing thermal oxidative deterioration during film formation through melt extrusion, and improving the leveling and the smoothness of a surface of the polymer film.

Examples of the heat stabilizer include a phenol-based stabilizer and an amine-based stabilizer, each having a radical scavenging action; a phosphite-based stabilizer and a sulfur-based stabilizer, each having a decomposition action of a peroxide; and a hybrid stabilizer having a radical scavenging action and a decomposition action of a peroxide.

Examples of the phenol-based stabilizer include a hindered phenol-based stabilizer, a semi-hindered phenol-based stabilizer, and a less hindered phenol-based stabilizer.

Examples of a commercially available product of the hindered phenol-based stabilizer include ADK STAB AO-20, AO-50, AO-60, and AO-330 manufactured by ADEKA Corporation; and Irganox 259, 1035, and 1098 manufactured by BASF.

Examples of a commercially available product of the semi-hindered phenol-based stabilizer include ADK STAB AO-80 manufactured by ADEKA Corporation; and Irganox 245 manufactured by BASF.

Examples of a commercially available product of the less hindered phenol-based stabilizer include NOCRAC 300 manufactured by Ouchi Shinko Chemical Industrial Co., Ltd.; and ADK STAB AO-30 and AO-40 manufactured by ADEKA Corporation.

Examples of a commercially available product of the phosphite-based stabilizer include ADK STAB-2112, PEP-8, PEP-36, and HP-10 manufactured by ADEKA Corporation.

Examples of a commercially available product of the hybrid stabilizer include SUMILIZER GP manufactured by Sumitomo Chemical Company.

As the heat stabilizer, the hindered phenol-based stabilizer, the semi-hindered phenol-based stabilizer, or the phosphite-based stabilizer is preferable, and the hindered phenol-based stabilizer is more preferable from the viewpoint that the heat stabilization effect is more excellent. On the other hand, in terms of electrical characteristics, a semi-hindered phenol-based stabilizer or a phosphite-based stabilizer is more preferable.

The heat stabilizers may be used alone or in combination of two or more kinds thereof.

In a case where the polymer film includes the heat stabilizer, a content thereof is preferably 0.0001% to 10% by mass, more preferably 0.01% to 5% by mass, and still more preferably 0.1% to 2% by mass with respect to the total mass of the polymer film.

Additives

The polymer film may include an additive other than the components. Examples of the additive include a plasticizer, a lubricant, inorganic and organic particles, and a UV absorbing material.

Examples of the plasticizer include an alkylphthalyl alkyl glycolate compound, a bisphenol compound (bisphenol A, bisphenol F), an alkylphthalyl alkyl glycolate compound, a phosphoric acid ester compound, a carboxylic acid ester compound, and a polyhydric alcohol. A content of the plasticizer may be 0% to 5% by mass with respect to the total mass of the polymer film.

Examples of the lubricant include a fatty acid ester and a metal soap (for example, a stearic acid inorganic salt). A content of the lubricant may be 0% to 5% by mass with respect to the total mass of the polymer film.

The polymer film may contain inorganic particles and/or organic particles as a reinforcing material, a matting agent, a dielectric constant, or a dielectric loss tangent improving material. Examples of inorganic particles include silica, titanium oxide, barium sulfate, talc, zirconia, alumina, silicon nitride, silicon carbide, calcium carbonate, silicate, glass beads, graphite, tungsten carbide, carbon black, clay, mica, carbon fiber, glass fiber, and metal powder. Examples of the organic particles include crosslinked acryl and crosslinked styrene. A content of the inorganic particles and the organic particles may be 0% to 50% by mass with respect to the total mass of the polymer film.

Examples of the UV absorbing material include a salicylate compound, a benzophenone compound, a benzotriazole compound, a substituted acrylonitrile compound, and an s-triazine compound. A content of the UV absorbing material may be 0% to 5% by mass with respect to the total mass of the polymer film.

In addition, the polymer film may include a polymer component other than the liquid crystal polymer.

Examples of the polymer component include thermoplastic polymers such as polyethylene terephthalate, modified polyethylene terephthalate, polycarbonate, polyarylate, polyamide, polyphenylene sulfide, and polyester ether ketone.

Physical Properties of Polymer Film

Thickness

A thickness of the polymer film is preferably 5 to 1,000 µm, more preferably 10 to 500 µm, and still more preferably 20 to 300 µm.

Furthermore, the thickness of the polymer film is an arithmetic mean value of the measured values obtained by measuring the thickness of the polymer film at any different 100 points from an observed image obtained by observing a cross-section along the thickness direction of a laminate using a scanning electron microscope (SEM).

Dielectric Characteristics

The standard dielectric loss tangent of the polymer film is not particularly limited, and is, for example, 0.0025 or less, preferably 0.0024 or less, more preferably 0.0022 or less, still more preferably 0.0020 or less, particularly preferably 0.0015 or less, and most preferably 0.0010 or less. The lower limit value is not particularly limited, and may be 0.0001 or more.

A relative dielectric constant of the polymer film varies depending on the application, but is preferably 2.0 to 4.0, and more preferably 2.5 to 3.5.

The dielectric characteristics including a standard dielectric loss tangent and a relative dielectric constant of the polymer film can be measured by a cavity resonator perturbation method. A specific method for measuring the dielectric characteristics of the polymer film will be described in an Example column which will be described later.

Linear Expansion Coefficient

The linear expansion coefficient (CTE) in the in-plane direction of the polymer film is preferably 14 to 22 ppm/° C., more preferably 16 to 20 ppm/° C., and still more preferably 17 to 19 ppm/° C.

Since in a case where the linear expansion coefficient in the in-plane direction of the polymer film is within the range, a difference thereof from the linear expansion coefficient of the copper foil (18 ppm/° C.) is small, a warpage of the laminate including the copper foil and the polymer film in the case of producing the laminate can be suppressed and an adhesiveness between the copper foil and the polymer film can be improved.

The linear expansion coefficient in the in-plane direction of the polymer film can be set in the range by, for example, using a polymer film satisfying Expression (2A).

A method for measuring the linear expansion coefficient in the in-plane direction of the polymer film will be described in Examples which will be described later.

The polymer film may have a monolayer structure or a laminated structure in which a plurality of layers are laminated. Furthermore, the term "monolayer structure" of the polymer film means that the polymer film is composed of the same material over the entire thickness.

Method for Producing Polymer Film

A method for producing the polymer film is not particularly limited as long as it can produce a polymer film satisfying Expressions (1A) and (2A), but it is preferable to produce the polymer film by inflation molding.

More specific examples of the method include a production method having a pelletizing step of kneading components constituting the above-mentioned polymer film to obtain pellets and a film forming step of forming a polymer film by inflation molding using a molten resin formed from the pellets, in which a specific heat treatment and an annealing treatment, which will each be described later, are performed in the film forming step.

Hereinafter, the step of manufacturing a polymer film including a liquid crystal polymer will be described in detail.

Pelletizing Step (1) Form of Raw Material

As the polymer such as a liquid crystal polymer used for the film formation, pellet-shaped, flake-shaped, or powdered polymer can be used as they are, but for the purpose of stabilizing the film formation or uniformly dispersing an additive (which means a component other than the liquid crystal polymer; the same applies hereinafter), pellets obtained by kneading one or more kinds of raw materials (meaning at least one of a polymer or an additive; the same applies hereinafter) using an extruder, and performing pelletization before use may be used.

(2) Drying or Drying Alternative by Vent

Before pelletizing, it is preferable to dry the liquid crystal polymer and the additive in advance. Examples of a drying method include a method of circulating heated air having a low dew point, and a method of dehumidifying by vacuum drying. In particular, in a case of a resin which is easily oxidized, vacuum drying or drying using an inert gas is preferable.

(3) Method for Supplying Raw Materials

A method for supplying raw materials may be a method in which raw materials are mixed in advance before being made into kneaded pellets and then supplied, a method in which raw materials are separately supplied into the extruder so as to be in a fixed ratio, or a method of a combination of the both.

(4) Atmosphere During Extrusion

In a case of melt extrusion, within a range not interfering with uniform dispersion, it is preferable to prevent thermal and oxidative deterioration as much as possible, and it is also effective to reduce an oxygen concentration by reducing the pressure using a vacuum pump or inflowing an inert gas. These methods may be carried out alone or in combination.

(5) Temperature

A kneading temperature is preferably set to be equal to or lower than a thermal decomposition temperature of the liquid crystal polymer and the additive, and is preferably set to a low temperature as much as possible within a range in which a load of the extruder and a decrease in uniform kneading property are not a problem.

(6) Pressure

A kneading resin pressure during pelletization is preferably 0.05 to 30 MPa. In a case of a resin in which coloration or gel is likely to be generated due to shearing, it is preferable to apply an internal pressure of approximately 1 to 10 MPa to the inside of the extruder to fill the inside of a twin-screw extruder with the resin raw material.

(7) Pelletizing Method

As a pelletizing method, a method of solidifying a noodle-shaped extrusion in water and then cutting the extrusion is generally used, but the pelletization may be performed by an under-water cut method for cutting while directly extruding from a mouthpiece into water after melting with the extruder, or a hot cut method for cutting while still hot.

(8) Pellet Size

A pellet size is preferably 1 to 300 $mm^2$ in a cross-sectional area and 1 to 30 mm in a length, and more preferably 2 to 100 $mm^2$ in a cross-sectional area and 1.5 to 10 mm in a length.

Drying (1) Purpose of Drying

Before a molten film formation, it is preferable to reduce a moisture and a volatile fraction in the pellets, and it is effective to dry the pellets. In a case where the pellets include a moisture or a volatile fraction, not only appearance is deteriorated due to incorporation of bubbles into the polymer film or the decrease in a haze, but also physical properties may be deteriorated due to a molecular chain breakage of the liquid crystal polymer, or roll contamination may occur due to generation of monomers or oligomers. In addition, depending on the type of the liquid crystal polymer used, it may be possible to suppress generation of an oxidative crosslinked substance during molten film formation by removing dissolved oxygen by the drying.

(2) Drying Method and Heating Method

In terms of drying efficiency and economical efficiency, a dehumidifying hot air dryer is generally used as a drying method, but the drying method is not particularly limited as long as a desired moisture content can be obtained. In addition, there is no problem in selecting a more appropriate method according to characteristics of the physical properties of the liquid crystal polymer.

Examples of a heating method include pressurized steam, heater heating, far-infrared irradiation, microwave heating, and a heat medium circulation heating method.

Film Forming Step

Hereinafter, as the film forming step, a step of forming a polymer film by inflation molding using pellets including a liquid crystal polymer will be described.

Extrusion Conditions

Drying of Raw Materials

In the melt plasticization step for pellets using an extruder, it is preferable to reduce a moisture and a volatile fraction in the pellets as in the pelletizing step, and it is effective to dry the pellets.

Method for Supplying Raw Materials

In a case where there are multiple types of raw materials (pellets) input from the extruder supply port, the raw materials may be mixed in advance (premix method), may be separately supplied into the extruder in a fixed ratio, or may be a combination of the both. In addition, in order to stabilize the extrusion, it is generally practiced to reduce a fluctuation of the temperature and a bulk specific density of the raw material charged from the supply port. Moreover, in terms of plasticization efficiency, a raw material temperature is preferably high as long as it does not block a supply port by pressure-sensitive adherence, and in a case where the raw material is in an amorphous state, the raw material temperature is preferably in the range of {Glass transition temperature (Tg) (° C.)–150° C.} to {Tg (° C.)–1° C.}, and in a case where the raw material is a crystalline resin, the raw material temperature is preferably in the range of {Melting point (Tm) (° C.)–150° C.} to {Tm (° C.)–1° C.}, and the raw material is heated or kept warm. In addition, in terms of plasticization efficiency, the bulk specific density of the raw material is preferably 0.3 times or more, and more preferably 0.4 times or more in a case of a molten state. In a case where the bulk specific density of the raw material is less than 0.3 times the specific density in the molten state, it is also preferable to perform a processing treatment such as compression of the raw material into pseudo-pellets.

Atmosphere During Extrusion

As for the atmosphere during melt extrusion, it is necessary to prevent heat and oxidative deterioration as much as possible within a range that does not hinder uniform dispersion as in the pelletizing step. It is also effective to inject an inert gas (nitrogen or the like), reduce the oxygen concentration in the extruder by using a vacuum hopper, and provide a vent port in the extruder to reduce the pressure by a vacuum pump. These depressurization and injection of the inert gas may be carried out independently or in combination.

Rotation Speed

A rotation speed of the extruder is preferably 5 to 300 rpm, more preferably 10 to 200 rpm, and still more preferably 15 to 100 rpm. In a case where the rotation rate is set to the lower limit value or more, the retention time is shortened, the decrease in the molecular weight can be suppressed due to thermal deterioration, and discoloration can be suppressed. In a case where the rotation rate is set to the upper limit value or less, a breakage of a molecular chain due to shearing can be suppressed, and a decrease in the molecular weight and an increase in generation of cross-linked gel can be suppressed. It is preferable to select appropriate conditions for the rotation speed from the viewpoints of both uniform dispersibility and thermal deterioration due to extension of the retention time.

Temperature

A barrel temperature (supply unit temperature $T_1°$ C., compression unit temperature $T_2°$ C., and measuring unit temperature $T_3°$ C.) is generally determined by the following method. In a case where the pellets are melt-plasticized at a target temperature T° C. by the extruder, the measuring unit temperature $T_3$ is set to T 20° C. in consideration of the shear calorific value. At this time, $T_2$ is set within a range of $T_3 \pm 20°$ C. in consideration of extrusion stability and thermal decomposability of the resin. Generally, $T_1$ is set to {$T_2$ (° C.)–5° C.} to {$T_2$ (° C.)–150° C.}, and the optimum value of $T_1$ is selected in terms of ensuring a friction between the resin and the barrel, which is a driving force (feed force) for feeding the resin, and preheating at the feed unit. In a case of a normal extruder, it is possible to subdivide each zone of $T_1$ to $T_3$ and set the temperature, and by performing settings such that the temperature change between each zone is gentle, it is possible to make it more stable. At this time, T is preferably set to be equal to or lower than the thermal deterioration temperature of the resin, and in a case where the thermal deterioration temperature is exceeded due to the shear heat generation of the extruder, it is generally performed to positively cool and remove the shear heat generation. In addition, in order to achieve both improved dispersibility and thermal deterioration, it is also effective to melt and mix a first half part in the extruder at a relatively high temperature and lower the resin temperature in a second half part.

Pressure

A resin pressure in the extruder is generally 1 to 50 MPa, and in terms of extrusion stability and melt uniformity, the resin pressure is preferably 2 to 30 MPa, and more preferably 3 to 20 MPa. In a case where the pressure in the extruder is 1 MPa or more, a filling rate of the melting in the extruder is sufficient, and therefore, the destabilization of the extrusion pressure and the generation of foreign matter due to the generation of retention portions can be suppressed. In addition, in a case where the pressure in the extruder is 50 MPa or less, it is possible to suppress the excessive shear stress received in the extruder, and therefore, thermal decomposition due to an increase in the resin temperature can be suppressed.

Retention Time

A retention time in the extruder (retention time during film formation) can be calculated from a volume of the extruder portion and a discharge capacity of the polymer, as in the pelletizing step. The retention time is preferably 10 seconds to 60 minutes, more preferably 15 seconds to 45 minutes, and still more preferably 30 seconds to 30 minutes. In a case where the retention time is 10 seconds or more, the melt plasticization and the dispersion of the additive are sufficient. In a case where the retention time is 30 minutes or less, it is preferable from the viewpoint that resin deterioration and discoloration of the resin can be suppressed.

Filtration

Type, Purpose of Installation, and Structure

It is generally used to provide a filtration equipment at the outlet of the extruder in order to prevent damage to the gear pump due to foreign matter included in the raw material and to extend the life of the filter having a fine pore size installed downstream of the extruder. It is preferable to perform so-called breaker plate type filtration in which a mesh-shaped filtering medium is used in combination with a reinforcing plate having a high opening ratio and having strength.

Mesh Size and Filtration Area

A mesh size is preferably 40 to 800 mesh, more preferably 60 to 700 mesh, and still more preferably 100 to 600 mesh. In a case where the mesh size is 40 mesh or more, it is possible to sufficiently suppress foreign matter from passing through the mesh. In addition, in a case where the mesh is 800 mesh or less, the improvement of the filtration pressure increase speed can be suppressed and the mesh replacement frequency can be reduced. In addition, in terms of filtration accuracy and strength maintenance, a plurality of types of filter meshes having different mesh sizes are often superimposed and used. Moreover, since the filtration opening area can be widened and the strength of the mesh can be maintained, the filter mesh may also be reinforced by using a breaker plate. An opening ratio of the breaker plate used is often 30% to 80% in terms of filtration efficiency and strength.

In addition, a screen changer with the same diameter as the barrel diameter of the extruder is often used, but in order to increase the filtration area, a larger diameter filter mesh is used by using a tapered pipe, or a plurality of breaker plates is also sometimes used by branching a flow channel. The filtration area is preferably selected with a flow rate of 0.05 to 5 g/cm² per second as a guide, more preferably 0.1 to 3 g/cm², and still more preferably 0.2 to 2 g/cm².

By capturing foreign matter, the filter is clogged and the filter pressure rises. At that time, it is necessary to stop the extruder and replace the filter, but a type in which the filter can be replaced while continuing extrusion can also be used. In addition, as a measure against an increase in the filtration pressure due to the capture of foreign matter, a measure having a function of lowering the filtration pressure by cleaning and removing the foreign matter trapped in the filter by reversing the flow channel of the polymer can also be used.

Inflation Molding

Hereinafter, an example of an embodiment of a method for producing the polymer film of the embodiment of the present invention by inflation molding will be described with reference to a specific production device.

The method for producing a polymer film of the embodiment of the present invention is not limited to the following embodiment, but in the present embodiment, it is easy to produce a polymer film satisfying Expressions (1A) and (2A). It is preferable to produce a polymer film by such a method.

FIG. 1 is a cross-sectional view showing an example of the configuration of a production device used for producing a polymer film by inflation molding.

A film forming device 10 shown in FIG. 1 includes an annular die 12 having an annular slit, a cooling blower 14, a heater 16, and a cooler 18. In the film forming device 10, the annular die 12, the cooling blower 14, the heater 16, and the cooler 18 are arranged in this order from the vertically lower side. In addition, the film forming device 10 is configured to supply a gas to the internal space of a cylindrical film F in a molten state extruded from the annular die 12.

A liquid crystal polymer in a molten state is continuously supplied to the annular die 12 from an extruder not shown. The supplied liquid crystal polymer in the molten state passes through the annular slit of the annular die 12, serves as the cylindrical film F, and is extruded vertically upward. The extruded cylindrical film F expands due to an air supplied to the inside of the film to increase the diameter, while the film is cooled by a cooling air stream discharged from the cooling blower 14, which is arranged concentrically with the annular die 12, above the annular die 12, and solidified in a frost line FL.

The heater 16 and the cooler 18 are used to perform a specific heat treatment which will be described later.

The temperature of a melt discharged from the annular die 12 (the temperature at an outlet of a supply unit) is preferably {Tm−10}° C. to {Tm+40}° C., where the melting point of the liquid crystal polymer is Tm (° C.), from the viewpoints of improving the moldability of the liquid crystal polymer and suppressing the deterioration. A standard for the melt viscosity is preferably 50 to 3,500 Pa·s.

A stretching ratio of the cylindrical film F in the film forming step by inflation molding according to the present embodiment is not particularly limited, but a ratio (Br/Dr) of the stretching ratio in the TD direction (blow ratio: Br) to the stretching ratio in the MD direction (draw ratio: Dr) is preferably 1.5 to 5, and more preferably 2.0 to 4.5.

In addition, the stretching ratio (Dr) in the MD direction is, for example, 1.0 to 5 times, preferably 1.1 to 3 times, and more preferably 1.2 to 2 times. In addition, the stretching ratio (Br) in the TD direction is, for example, 1.5 to 20 times, preferably 2 to 15 times, and more preferably 2.5 to 14 times.

Specific Heat Treatment

In the production method of the present embodiment, in a process of expansion by inflation molding, the cylindrical film F is reheated using the heater 16 before the cylindrical film F is solidified, and immediately after that, a heat treatment step of cooling the cylindrical film F is performed using the cooler 18. Hereinafter, the series of heat treatments consisting of reheating and cooling performed in the process of expanding the cylindrical film F will also be referred to as a "specific heat treatment".

By subjecting the expanding cylindrical film F to the specific heat treatment before solidification (before reaching the frost line FL), a hardness distribution in the thickness direction, in which the hardness is increased in the central part in the thickness direction of the cylindrical film F and the hardness is decreased in the surface layer part close to the surface, easily occurs, but it is considered that the hardness of the film as a whole is increased.

Detailed mechanism by which such a hardness distribution easily occurs and the hardness of the film as a whole is increased is not clear, but the present inventors presume that the occurrence is caused by heating a film surface to a temperature near the melting point by a reheating treatment while the film surface was cooled immediately after the heating so that the inflation film forming property was not impaired and the crystal structure of the surface layer part of the film was changed by melting and quenching.

A timing of performing the specific heat treatment is not particularly limited as long as it is before the cylindrical film is solidified, but with respect to a final stretching ratio in the TD direction by inflation molding, the specific heat treatment is performed so that the stretching ratio of the cylindrical film F in the expansion process is preferably more than 50%, more preferably more than 80%, and still more preferably more than 90%.

The stretching ratio in the TD direction can be confirmed by measuring the diameter or the length of the cylindrical film F in the circumferential direction. In addition, a timing of reheating the cylindrical film F can also be adjusted by adjusting the position of the heater 16 in the vertical direction. The same applies to the position of the cooler 18 and the timing of performing the cooling.

The conditions for the specific heat treatment are appropriately adjusted according to a material constituting the polymer film, a desired hardness, and the like.

As for a temperature for the reheating, the melting point of the liquid crystal polymer as Tm (° C.) is preferably {Tm−10}° C. or higher, and more preferably higher than Tm from the viewpoint that a hardness distribution in the thickness direction can be further clarified. In addition, the reheating temperature is preferably {Tm+20}° C. or lower, and more preferably {Tm+15}° C. or lower from the viewpoint that the occurrence of a thickness unevenness due to softening of the film can be suppressed.

A treatment time for reheating varies depending on a heating unit and a heating temperature, but is preferably 0.2 to 15 seconds, and more preferably 1 to 10 seconds.

Examples of the heating unit (heater 16) used for reheating include known heating units such as a hot air dryer and an infrared heater, and the infrared heater is preferable since the film surface temperature can be elevated in a short time. In addition, it is preferable to perform reheating so that a temperature difference in the circumferential direction of the cylindrical film F is decreased by arranging the heating unit to surround the periphery of the cylindrical film F.

It is preferable that the cooling treatment in the specific heat treatment is performed immediately after the reheating in order to form a structure of the film surface layer and suppress the thickness unevenness. In the cooling treatment, it is preferable to lower the surface temperature of the cylindrical film F at a rate of −10° C./sec or more (more preferably −20° C./sec or more, and still more preferably −30° C./sec or more).

The cooling treatment is preferably performed until the surface temperature of the cylindrical film F is lower than the crystallization temperature. The crystallization temperature can be measured at a recrystallization peak temperature in a case of performing heating to a melting point or higher by DSC and performing cooling at 10° C./min. The specific cooling treatment time varies depending on the cooling unit and the temperature of a film surface heated by reheating, but is preferably 0.3 to 15 seconds, and more preferably 2 to 5 seconds.

As the cooling unit (cooler 18) used for the cooling treatment, a known cooling device can be used, but it is preferable to use a blower that blows air (preferably cold air) on the cylindrical film F. It is preferable to arrange such a blower so that a temperature difference in the circumferential direction is decreased by arranging the blower to surround the periphery of the cylindrical film F.

The solidified cylindrical film F is nipped by a nip roll (not shown) above the film forming device 10, and then wound by a winder (not shown) to obtain a polymer film.

Relaxation Treatment

In the present embodiment, a relaxation step of alleviating a strain that is present inside the film may be performed by thermally shrinking the inflation-molded polymer film. In the relaxation step, the polymer film is thermally shrunk in the TD direction under a tension (for example, about 2.0 to 3.0 kg/mm$^2$ in the MD direction). The shrinkage rate is, for example, 1% or more, and preferably 1.5% or more in the TD direction. The upper limit of the shrinkage rate is appropriately determined depending on the film, but is often 4% or less in the TD direction.

The relaxation treatment can be carried out, for example, by introducing the polymer film into a known heating device such as a hot-air drying furnace. The set temperature of the relaxation treatment is preferably Tm or lower, and more preferably {Tm−30}° C. or lower, with the melting point of the liquid crystal polymer defined as Tm (° C.). The lower limit is not particularly limited, but is preferably {Tm−120}° C. or higher, and more preferably {Tm−90}° C. or higher. Alternatively, the set temperature of the relaxation treatment is preferably approximately 200° C. to 290° C., and more preferably approximately 230° C. to 270° C.

Annealing Treatment

In the production method of the present embodiment, after the specific heat treatment, an annealing treatment in which the polymer film is heated to near the melting temperature is performed. The annealing treatment is preferably carried out after the specific heat treatment and before the relaxation treatment.

The molecular weight of a liquid crystal domain in the polymer film is increased by performing the annealing treatment after the specific heat treatment (preferably after the relaxation treatment).

The heating temperature in the annealing treatment is preferably {Tm−30}° C. to {Tm+10}° C., and more preferably {Tm−25}° C. to {Tm+5}° C. from the viewpoint that a polymer film satisfying Expression (2A) can be easily obtained, where the melting point of the polymer film is defined as Tm (° C.). The heating time in the annealing treatment is preferably 10 seconds to 24 hours, and more preferably 4 to 12 hours.

Examples of the heating unit in the annealing treatment include a hot-air drying furnace and a thermal press (for example, a surface press or a heating roll), and the thermal press is preferable.

In the annealing treatment, it is preferable to use a composite in which the polymer film is laminated on an adherend (for example, a metal foil such as a copper foil and an aluminum foil) from the viewpoint that deformation of the polymer film, and the like during heating can be suppressed.

In a case where the annealing treatment is performed using the composite, it is preferable to perform an annealing treatment after performing a heat treatment so that the thermal expansion coefficient of the polymer film is the same one (for example, $16 \times 10^{-6}$ to $26 \times 10^{-6}$ cm/cm/° C.) as the thermal expansion coefficient of the adherend. After performing the annealing treatment using the composite, the adherend is peeled from the composite to obtain a polymer film.

After the annealing treatment, a thermal relaxation treatment may further be performed.

Surface Treatment

Since the adhesiveness between the polymer film and the metal-containing layer or another layer can be further improved, it is preferable to subject the polymer film to a surface treatment. Examples of the surface treatment include a glow discharge treatment, an ultraviolet irradiation treatment, a corona treatment, a flame treatment, and an acid or alkali treatment. The glow discharge treatment as mentioned herein may be a treatment with a low-temperature plasma generated in a gas at a low pressure ranging from $10^{-3}$ to 20 Torr, and is preferably a plasma treatment under atmospheric pressure.

The glow discharge treatment is performed using a plasma-excited gas. The plasma-excited gas refers to a gas that is plasma-excited under the above-described conditions, and examples thereof include argon, helium, neon, krypton, xenon, nitrogen, and carbon dioxide, fluorocarbons such as tetrafluoromethane, and mixtures of these.

It is also useful to subject the polymer film to an aging treatment at a temperature which is temperature equal to or lower than the Tg of the liquid crystal polymer in order to improve the mechanical properties, thermal dimensional stability, or winding shape of the wound polymer film.

In addition, with regard to the polymer film, the smoothness of the polymer film may be further improved by further performing a step of compressing the polymer film with a heating roll and/or a step of stretching the polymer film after performing the film forming step.

Laminate

The laminate of an embodiment of the present invention has the polymer film and at least one metal-containing layer.

Hereinafter, the configuration of the laminate according to the embodiment of the present invention will be described in detail.

The laminate has at least one metal-containing layer and at least one polymer film. The number of the metal-containing layers and the polymer films contained in the laminate is not limited, and the number of each layer may be only one or two or more.

The laminate may be a single-sided laminate having only one metal-containing layer on one side of one polymer film, or may be a double-sided laminate having two metal-containing layers on both sides of one polymer film.

Above all, it is preferable that the laminate has at least a layer configuration in which the metal-containing layer, the polymer film, and the metal-containing layer are laminated in this order.

In addition, the laminate may have a multilayer structure in which three or more metal-containing layers and two or more polymer films are alternately laminated. That is, the laminate may have a multilayer structure in which three or more metal layers or metal wiring lines are arranged via an insulating layer consisting of a polymer film. A laminate having such a multilayer structure can be applied as a highly functional multilayer circuit board (for example, a two-layer circuit board, a three-layer circuit board, and a four-layer circuit board).

The laminate may be a monolayer circuit board provided with two metal layers or metal wiring lines and an insulating layer consisting of one polymer film. In addition, the laminate may be an intermediate for producing a laminate having a multilayer structure, which is provided with one or two metal layers or an insulating layer consisting of a metal wiring line and one polymer film.

Metal-Containing Layer

The metal-containing layer is not particularly limited as long as it is a layer that is formed on a surface of a polymer film and includes a metal, and examples thereof include a metal layer covering the entire surface of the polymer film and a metal wiring line formed on the surface of the polymer film.

Examples of a material constituting the metal-containing layer include metals used for electrical connection. Examples of such metals include copper, gold, silver, nickel, aluminum, and alloys including any of these metals. Examples of the alloy include a copper-zinc alloy, a copper-nickel alloy, and a zinc-nickel alloy.

As a material constituting the metal-containing layer, copper is preferable from the viewpoint that the conductivity and the workability are excellent. As the metal-containing layer, a copper layer or a copper wiring line, which consists of copper or a copper alloy including 95% by mass or more of copper, is preferable. Examples of the copper layer include a rolled copper foil produced by a rolling method, and an electrolytic copper foil produced by an electrolysis method. The metal-containing layer may be subjected to a chemical treatment such as pickling.

As will be described later, the metal-containing layer is produced using, for example, a metal foil, and a wiring pattern is formed by a known processing method, as necessary.

In a case where a metal foil such as a copper foil is used for producing a laminate, a surface roughness Ra of a surface (at least one surface) of the metal foil is preferably 3 μm or less, and more preferably 1.5 μm or less from the viewpoint that the effect of the present invention is more excellent. The lower limit value is not particularly limited, and is, for example, 0.1 μm or more, and preferably 0.3 μm or more.

Examples of the metal foil having a surface roughness Ra in the range include a non-roughened copper foil, which is available on the market.

The Ra on a surface of the metal foil and the metal-containing layer is determined by a method in accordance with JIS B 0601, using a surface roughness measuring instrument (for example, manufactured by Mitutoyo Co., Ltd., product name: SurfTest SJ-201). A specific measurement method therefor will be described in Examples which will be described later.

A thickness of the metal-containing layer is not particularly limited, and is appropriately selected depending on a use of a circuit board, but the thickness is preferably 1 to 100 μm, more preferably 5 to 30 μm, and still more preferably 10 to 20 μm from the viewpoints of wiring line conductivity and economical efficiency.

The laminate may have a layer other than the polymer film and the metal-containing layer, as necessary. Examples of such the other layer include an adhesive layer, a rust preventive layer, and a heat resistant layer.

Adhesive Layer

The laminate preferably has an adhesive layer from the viewpoint that the adhesiveness between the polymer film and the metal-containing layer is more excellent.

In a case where the laminate has an adhesive layer, the adhesive layer is preferably arranged between the polymer film and the metal-containing layer. For example, in a case where two metal-containing layers are arranged on both sides of the polymer film, it is preferable that the metal-containing layer, the adhesive layer, the polymer film, the adhesive layer, and the metal-containing layer are laminated in this order.

As the adhesive layer, a known adhesive layer used for producing a wiring board such as a copper-clad laminate can be used, and examples thereof include a layer consisting of a cured product of an adhesive composition including a known binder resin.

The adhesive composition used for forming the adhesive layer is not particularly limited, and examples thereof include a composition including a binder resin, and further including an at least one selected from the group consisting of a reactive compound and an additive, which will be described later, as an optional component.

Binder Resin

Examples of the binder resin include a (meth)acrylic resin, a polyvinyl cinnamate, a polycarbonate, a polyimide, a polyamidoimide, a polyesterimide, a polyetherimide, a polyether ketone, a polyether ether ketone, a polyethersulfone, a polysulfone, a polyparaxylene, a polyester, a polyvinyl acetal, a polyvinyl chloride, a polyvinyl acetate, a polyamide, a polystyrene, a polyurethane, a polyvinyl alcohol, a cellulose acylate, a fluororesin, a liquid crystal polymer, a syndiotactic polystyrene, a silicone resin, an epoxy silicone resin, a phenol resin, an alkyd resin, an epoxy resin, a maleic acid resin, a melamine resin, a urea resin, an aromatic sulfonamide, a benzoguanamine resin, a silicone elastomer, an aliphatic polyolefin (for example, polyethylene and polypropylene), and a cyclic olefin copolymer. Among those, the polyimide, the liquid crystal polymer, the syndiotactic polystyrene, or the cyclic olefin copolymer is preferable, and the polyimide is more preferable.

The binder resins may be used alone or in combination of two or more kinds thereof.

A content of the binder resin is preferably 60% to 99.9% by mass, more preferably 70% to 99.0% by mass, and still more preferably 80% to 97.0% by mass with respect to the total mass of the adhesive layer.

Reactive Compound

The adhesive layer may include a reactant of a compound having a reactive group, and preferably includes a reactive compound. In the present specification, the compound having a reactive group and a reaction product thereof are also collectively referred to as a "reactive compound".

The reactive group contained in the reactive compound is preferably a group capable of reacting with a group which may be present on a surface of the polymer film (in particular, a group having an oxygen atom, such as a carboxy group and a hydroxy group).

Examples of the reactive group include an epoxy group, an oxetanyl group, an isocyanate group, an acid anhydride group, a carbodiimide group, an N-hydroxyester group, a glyoxal group, an imide ester group, an alkyl halide group, and a thiol group; and at least one group selected from the group consisting of the epoxy group, the acid anhydride group, and the carbodiimide group is preferable, and the epoxy group is more preferable.

Specific examples of the reactive compound having an epoxy group include aromatic glycidylamine compounds (for example, N,N-diglycidyl-4-glycidyloxyaniline, 4,4'-methylenebis(N,N-diglycidylaniline), N,N-diglycidyl-o-toluidine, and N,N,N',N'-tetraglycidyl-m-xylene diamine, 4-t-butylphenylglycidyl ether), aliphatic glycidylamine compounds (for example, 1,3-bis(diglycidylaminomethyl) cyclohexane), and aliphatic glycidyl ether compounds (for example, sorbitol polyglycidyl ether).

Specific examples of the reactive compound having an acid anhydride group include tetracarboxylic dianhydrides (for example, 3,3',4,4'-benzophenone tetracarboxylic dianhydride, 3,3',4,4'-biphenyltetracarboxylic dianhydride, pyromellitic dianhydride, 2,3,3',4'-biphenyltetracarboxylic dianhydride, oxydiphthalic dianhydride, diphenylsulfone-3, 4,3',4'-tetracarboxylic dianhydride, bis(3,4-dicarboxyphenyl)sulfide dianhydride, 2,2-bis(3,4-dicarboxyphenyl)-1,1, 1,3,3,3-hexafluoropropane dianhydride, 2,3,3',4'-benzophenone tetracarboxylic dianhydride, bis(3,4-dicarboxyphenyl)methane dianhydride, 2,2-bis(3,4-dicarboxyphenyl)propane dianhydride, p-phenylenebis (trimellitic acid monoester anhydride), p-biphenylenebis (trimellitic acid monoester anhydride), m-terphenyl-3,4,3', 4'-tetracarboxylic dianhydride, p-terphenyl-3,4,3',4'-tetracarboxylic dianhydride, 1,3-bis(3,4-dicarboxyphenoxy) benzene dianhydride, 1,4-bis(3,4-dicarboxyphenoxy) benzene dianhydride, 1,4-bis(3,4-dicarboxyphenoxy) biphenyl dianhydride, 2,2-bis [(3,4-dicarboxyphenoxy) phenyl]propane dianhydride, 2,3,6,7-naphthalenetetracarboxylic dianhydride, 1,4,5,8-naphthalenetetracarboxylic dianhydride, and 4,4'-(2,2-hexafluoroisopropyridene)diphthalic dianhydride).

Specific examples of the reactive compound having a carbodiimide group include monocarbodiimide compounds (for example, dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, di-β-naphthylcarbodiimide, N,N'-di-2,6-diisopropylphenylcarbodiimide), and polycarbodiimide compounds (for example, compounds produced by the methods described in U.S. Pat. No. 2,941, 956A, JP1972-033279B (JP-S47-033279B), J. Org. Chem. 28, p. 2069-2075 (1963), Chemical Review 1981, 81, No. 4, p. 619-621, and the like).

Examples of a commercially available product of the reactive compound having a carbodiimide group include Carbodilite (registered trademark) HMV-8CA, LA-1, and V-03 (both manufactured by Nisshinbo Chemical Inc.), and Stabaxol (registered trademark) P, P100, and P400 (all manufactured by Rhein Chemie Japan Ltd.), and Stabilizer 9000 (product name, manufactured by Rhein Chemie Corporation).

The number of the reactive groups contained in the reactive compound is 1 or more, but is preferably 3 or more from the viewpoint that the adhesiveness between the polymer film and the metal-containing layer is more excellent. The upper limit is not particularly limited, but is, for example, 6 or less, and preferably 5 or less.

A reaction product of the compound having a reactive group is not particularly limited as long as it is a compound derived from the compound having a reactive group, and examples thereof include a reaction product obtained by a reaction between the reactive group of the compound having a reactive group and a group including an oxygen atom present on a surface of the polymer film.

The reactive compounds may be used alone or in combination of two or more kinds thereof.

A content of the reactive compound is preferably 0.1% to 40% by mass, more preferably 1% to 30% by mass, and still more preferably 3% to 20% by mass with respect to the total mass of the adhesive layer.

The adhesive layer may further include a component (hereinafter also referred to as an "additive") other than the binder resin and the reactive compound.

Examples of the additive include an inorganic filler, a curing catalyst, and a flame retardant.

A content of the additive is preferably 0.1% to 40% by mass, more preferably 1% to 30% by mass, and still more preferably 3% to 20% by mass with respect to the total mass of the adhesive layer.

Thickness

In a case where the laminate has an adhesive layer, the thickness of the adhesive layer is preferably 0.05 μm or more, more preferably 0.1 μm or more, and still more preferably 0.2 μm or more from the viewpoint that the adhesiveness between the polymer film and the metal-containing layer is more excellent. The upper limit is not particularly limited, but is preferably 1 μm or less, more preferably 0.8 μm or less, and still more preferably 0.6 μm or less.

In addition, a ratio of the thickness of the adhesive layer to the thickness of the polymer film is preferably 0.1% to 2%, and more preferably 0.2 to 1.6% from the viewpoint that the adhesiveness between the polymer film and the metal-containing layer is more excellent.

Incidentally, the thickness of the adhesive layer is a thickness per adhesive layer.

The thickness of the adhesive layer can be measured according to the method for measuring a thickness of the polymer film.

Method for Producing Laminate

A method for producing the laminate is not particularly limited, and examples thereof include a method having a step of laminating the polymer film of the embodiment of the present invention and a metal foil, and then pressing the polymer film and the metal foil under high-temperature conditions to produce a laminate (hereinafter referred to as a "step B").

Step B

In the step B, the polymer film of the embodiment of the present invention and a metal foil consisting of a metal constituting the metal-containing layer are laminated, and the polymer film and the metal foil are compressed under high-temperature conditions to produce a laminate having the polymer film and the metal-containing layer.

The polymer film and the metal foil used in the step B are as described above. The methods and conditions for thermocompression of the polymer film and the metal foil in the step B are not particularly limited, and are appropriately selected from known methods and conditions.

The temperature condition for thermocompression is preferably {Tm−80}° C. to {Tm+30}° C., and more preferably {Tm−40}° C. to Tm° C., where the melting point of the polymer film is defined as Tm (° C.). The pressure condition for thermocompression is preferably 0.1 to 20 MPa. The treatment time of the compression treatment is preferably 0.001 to 1.5 hours.

The metal-containing layer provided in the laminate may be a patterned metal wiring line. A method for producing the metal wiring line is not particularly limited, and examples thereof include a method in which the metal wiring line is formed by performing the step B in which the polymer film and the metal foil are laminated by thermocompression, and then a metal layer thus formed is subjected to an etching treatment and the like. In addition, a patterned metal wiring line may be directly formed on a surface of a polymer film by a known method such as a sputtering method, an ion plating method, a vapor phase method such as a vacuum vapor deposition method, and a wet plating method.

Adhesive Layer Forming Step

In a case where producing a laminate having a polymer film, an adhesive layer and a metal-containing layer in this order, a laminate having an adhesive layer can be obtained by performing a step of forming the adhesive layer on at least one of the polymer films using an adhesive composition, and then performing the step B using the polymer film with the adhesive layer and a metal foil.

Examples of the adhesive layer forming step include a step in which an adhesive composition is applied onto at least one surface of the polymer film, and the coating film is dried and/or cured, as necessary, to form an adhesive layer on the polymer film.

Examples of the adhesive composition include a composition including components constituting the adhesive layer, such as the binder resin, the reactive compound, and the additive, and a solvent. Since the components constituting the adhesive layer are as described above, descriptions thereof will be omitted.

Examples of the solvent (organic solvent) include ester compounds (for example, ethyl acetate, n-butyl acetate, and isobutyl acetate) and ether compounds (for example, ethylene glycol dimethyl ether, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, and diethylene glycol monoethyl ether), ketone compounds (for example, methyl ethyl ketone, cyclohexanone, cyclopentanone, 2-heptanone, and 3-heptanone), hydrocarbon compounds (hexane, cyclohexane, and methylcyclohexane), as well as aromatic hydrocarbon compounds (for example, toluene and xylene).

The solvents may be used alone or in two or more kinds thereof.

A content of the solvent is preferably 0.0005% to 0.02% by mass, and more preferably 0.001% to 0.01% by mass with respect to the total mass of the adhesive composition.

A solid content of the adhesive composition is preferably 99.98% to 99.9995% by mass, and more preferably 99.99% to 99.999% by mass with respect to the total mass of the adhesive composition.

In the present specification, the "solid content" of a composition means components excluding a solvent (organic solvent) and water. That is, the solid content of the adhesive composition is intended to be components constituting the adhesive layer, such as the binder resin, the reactive compound, and the additive.

A method for adhering the adhesive composition on the polymer film is not particularly limited, and examples thereof include a bar coating method, a spray coating method, a squeegee coating method, a flow coating method, a spin coating method, a dip coating method, a die coating method, an ink jet method, and a curtain coating method.

In a case where the adhesive composition adhered on the polymer film is dried, the drying conditions are not particularly limited, but the drying temperature is preferably 25° C. to 200° C. and the drying time is preferably 1 second to 120 minutes.

In the method for producing a laminate, the laminate of the embodiment of the present invention can be produced by performing a step of forming an adhesive layer using an adhesive composition, then laminating a polymer film and a metal-containing layer (with an adhesive layer), and performing the step B in which the polymer film and a metal foil are thermocompression.

Furthermore, the method for producing the laminate of the embodiment of the present invention, having a polymer film and a metal-containing layer, is not limited to the method.

For example, a laminate in which a polymer film, an adhesive layer, and a metal-containing layer are laminated in this order can be manufactured by applying the adhesive composition onto at least one surface of a metal foil, and drying and/or curing the coating film, as necessary, to form the adhesive layer, then laminating the metal foil with the adhesive layer and the polymer film so that the adhesive layer is in contact with the polymer film, and then subjecting the metal foil, the adhesive layer, and the polymer film to thermocompression according to the method described in the step B.

In addition, the laminate may be produced by forming a metal-containing layer on a surface of the polymer film by a known method such as deposition, electroless plating, and electrolytic plating.

The laminate produced by the production method can be used in the production of the above-mentioned multilayer circuit board.

For example, a circuit board having a multilayer structure can be produced by subjecting the metal layer provided in the laminate (first laminate) produced by the production method to a patterning step as necessary to form a metal wiring line, then laminating a first laminate having the metal wiring line and a second laminate formed by sticking a metal layer onto one surface of an insulating layer consisting of a polymer film so that a surface of the first laminate on the metal wiring line side and a surface of the second laminate on the insulating layer side are in contact with each other, and subjecting a laminate thus obtained to thermocompression in accordance with the step B.

At this time, it is possible to suppress the misregistration in the in-plane direction (direction perpendicular to the laminated direction) of the metal wiring line at the time of laminating the first laminate and the second laminate) by using the polymer film of the embodiment of the present invention for production of the first laminate.

Use of Laminate

Examples of the use of the laminate include a laminated circuit board, a flexible laminated board, and a wiring board such as a flexible printed wiring board (FPC). The laminate is particularly preferably used as a high-speed communication substrate.

EXAMPLES

Hereinbelow, the present invention will be more specifically described with reference to Examples. The materials, the amounts of materials used, the proportions, the treatment details, and the treatment procedure shown in Examples below may be modified as appropriate as long as the modifications do not depart from the spirit of the present invention. Therefore, the present invention is not limited to the aspects shown in Examples below. Furthermore, the terms "part" and "%" are based on mass unless otherwise specified.

Raw Materials

Liquid Crystal Polymer

A polymer film was produced using the following liquid crystal polymer.

LCP1: "VECTRA (registered trademark) A950" manufactured by Polyplastics Co., Ltd., thermoplastic liquid crystal polyester resin, melting point Tm: 280° C.

LCP2: "VECTRA (registered trademark) C950" manufactured by Polyplastics Co., Ltd., thermoplastic liquid crystal polyester resin, melting point Tm: 320° C.

Both LCP1 and LCP2 are type II liquid crystal polymers composed of a repeating unit derived from parahydroxybenzoic acid and a repeating unit derived from 6-hydroxy-2-naphthoic acid.

Metal Foil

The following metal foils were used in the production of a metal-clad laminate.

Copper foil 1: Rolled copper foil, thickness of 12 μm, surface roughness Ra of 0.9 μm.

Copper foil 2: Rolled copper foil, thickness of 18 μm, surface roughness Ra of 0.9 μm.

A surface roughness Ra of the copper foil can be calculated by measuring values of an arithmetic mean roughness Ra at ten points on a surface of the copper foil in accordance with JIS B0601, using a surface roughness measuring instrument (manufactured by Mitutoyo Co., Ltd., product name: SurfTest SJ-201), and averaging the measured values.

Example 1

A polymer film was produced by the following method, using the production device shown in FIG. 1. Furthermore, detailed conditions for inflation molding will be described later.

Film Forming Step by Inflation Molding (Step A)

The pellets of LCP1 were dried by preheating at a temperature of 150° C. for 6 hours, and then supplied into a cylinder (diameter of 60 mm) of a single-screw extruder, and heated and kneaded at 295° C., and a melt of LCP1 was extruded from an annular die having the following structure at a die shear rate of 1,000 seconds$^{-1}$ to form a cylindrical film.

Thereafter, using a production device (inflation molding device) having the following configuration, air was supplied to the internal space of the discharged cylindrical film in the molten state while cooling the outer surface thereof, and the cylindrical film was expanded by internal pressure. At this time, the stretching ratio was controlled so that a ratio of the stretching ratio in the TD direction (circumferential direction) to the stretching ratio in the MD direction (longitudinal direction) of the expanded cylindrical film was 3.

In addition, the cylindrical film stretched while moving upward was subjected to a specific heat treatment in which the cylindrical film was heated at a position where the stretching ratio in the TD direction exceeded 90% of a final magnification, and immediately cooled.

More specifically, as a specific heat treatment, heating was performed for 2 seconds so that a surface temperature of the cylindrical film reached a temperature which will be described later, using an infrared heater arranged at the position. Immediately after that, using a cold air nozzle arranged directly above the infrared heater, cooling was performed for 2 seconds so that a surface temperature of the cylindrical film was decreased at a cooling rate which will be described later. Then, the film was trimmed and wound in the form of a film.

Next, the manufactured film was subjected to a relaxation treatment for a thermal shrinkage in the TD direction by introducing the film into a hot-air drying furnace set at 260° C. and heating while applying a tension to the film in the MD direction. A thermal shrinkage rate of the film before and after the relaxation treatment was 2%.

Next, the relaxation-treated film was subjected to an annealing treatment for increasing the molecular weight of the liquid crystal domain that is present inside the film by introducing the film into a hot-air drying furnace set at 270° C. and heating for 10 hours.

The film after the annealing treatment was transported while being guided by a roller, and taken up by a nip roller to obtain the polymer film of the embodiment of the present invention. A thickness of the produced polymer film was 50 μm.

Each production condition of the polymer film of Example 1 and the configuration of the inflation molding device are shown below.

Melting temperature of extruder: 295° C.

Discharge temperature of raw material resin: 283° C.

Discharge amount of raw material resin (melting): 13 kg/hour

Diameter of annular die: 50 mm

Slit width of annular die: 250 μm

Cooling ring position: 30 mm vertically above the annular die

Temperature of gas blown out from cooling ring: 150° C.

Wind speed of gas blown out from cooling ring: 5 msec

Position of infrared heater: 350 mm vertically above annular die

Film surface heating temperature: 290° C.

Position of cooling device: 450 mm vertically above annular die

Film surface cooling rate: −50° C./sec

Expansion coefficient in TD direction: 4 times

Expansion coefficient in TD direction/expansion coefficient in MD direction: 3

Take-up speed of polymer film: 9.9 m/min

Production of Metal-Clad Laminate (Step B)

The polymer film produced in the step and the two copper foils 1 were laminated, and the laminate was introduced between a heat-resistant rubber roll and a heating metal roll provided in a continuous thermal press machine, and compressed, thereby producing a copper-clad laminate in which the copper foil 1, the polymer film, and the copper foil 1 in this order.

A resin-coated metal roll (manufactured by Yuri Roll Machine Co., Ltd., product name: Super-Tempex, resin thickness: 1.7 cm) was used as the heat-resistant rubber roll. In addition, as the heat-resistant rubber roll and the heating metal roll, those having a diameter of 40 cm were used.

A surface temperature of the heating metal roll was set to 260° C. Further, pressures applied to the polymer film and the copper foil 1 between the heat-resistant rubber roll and the heating metal roll were set to 120 kg/cm$^2$ in terms of a surface pressure.

Examples 2 and 3

Polymer films of Examples 2 and 3 were produced according to the method described in the step A of Example 1, except that the annealing treatment was changed to that under conditions shown in Table 1 which will be described later.

Next, double-sided copper-clad laminates of Examples 2 and 3 were each produced according to the method described in the step B of Example 1, except that each of the produced polymer films was used.

Example 4

A polymer film of Example 4 was produced according to the method described in the step A of Example 1, except that the annealing treatment was carried out by a method shown below.

The annealing treatment in Example 4 is as follows. First, a composite in which a relaxation-treated film was laminated on an adherend (copper foil) was manufactured. Next, thermal press was performed at 300° C. for 1 hour, using the obtained composite. Furthermore, a pressure applied to the composite was set to 40 kg/cm$^2$ in terms of a surface pressure. Thereafter, the cylindrical film was peeled from the adherend after the annealing treatment to obtain a film after the annealing treatment.

Next, a double-sided copper-clad laminate of Example 4 was manufactured according to the method described in the step B of Example 1, except that the produced polymer film was used.

Example 5

The polymer film of Example 5 was produced in the same manner as in the method described in the step A of Example 1.

Next, a double-sided copper-clad laminate of Example 5 was manufactured according to the method described in the step B of Example 1, except that each of the produced polymer films was used and the two copper foils 2 were used instead of the two copper foils 1.

Example 6

A polymer film of Example 6 was produced in the same manner as in the method described in the step A of Example 1.

Next, a crosslinking agent solution (crosslinking agent: N,N-diglycidyl-4-glycidyloxyaniline (manufactured by Sigma-Aldrich Co. LLC.) solvent: toluene, concentration of crosslinking agent: 10% by mass) which is an adhesive was applied to both sides of the polymer film before carrying out the step B, and the solvent component was removed by drying in a continuous drying furnace at 110° C. to obtain a polymer film having adhesive layers on both sides. A thickness of the adhesive layer after drying was 0.001 mm.

A double-sided copper-clad laminate of Example 6 was manufactured according to the method described in the step B of Example 1, except that a polymer film having adhesive layers on both sides thus obtained was used.

Example 7

A polymer film of Example 7 was produced in the same manner as in the method described in the step A of Example 3.

Next, a double-sided copper-clad laminate of Example 7 was manufactured in the same manner as in Example 6, except that the produced polymer film was used.

Example 8

A polymer film of Example 8 was produced in the same manner as in the method described in the step A of Example 4.

Next, a double-sided copper-clad laminate of Example 8 was manufactured in the same manner as in Example 6, except that the produced polymer film was used.

Example 9

A polymer film of Example 9 was produced according to the method described in the step A of Example 1, except that LCP2 was used instead of LCP1 as a raw material for a liquid crystal polymer, the heating temperature in the specific heat treatment was changed to the conditions shown in Table 1 which will be described later, and the annealing treatment was changed to that under the conditions shown in Table 1 which will be described later.

Next, a double-sided copper-clad laminate of Example 9 was manufactured according to the method described in the step B of Example 1, except that the produced polymer film was used and the surface temperature of the heating metal roll was set to 290° C.

Comparative Example 1

The polymer film of Comparative Example 1 was produced according to the method described in the step A of Example 1, except that the film formed by inflation molding was not subjected to the specific heat treatment and the annealing treatment was not performed.

Next, a double-sided copper-clad laminate of Comparative Example 1 was manufactured according to the method described in the step B of Example 1, except that the produced polymer film was used and the two copper foils 2 were used instead of the two copper foils 1.

Comparative Example 2

The polymer film of Comparative Example 2 was produced according to the method described in the step A of Example 1, except that the film formed by inflation molding was not subjected to the specific heat treatment.

Next, a double-sided copper-clad laminate of Comparative Example 2 was manufactured according to the method described in the step B of Example 1, except that the produced polymer film was used and the two copper foils 2 were used instead of the two copper foils 1.

Characteristics of Polymer Film

Void Area Proportion

A void area proportion of the polymer film produced in each example was measured by the following method.

The polymer film produced in each example was cut along the thickness direction at room temperature (25° C.), using a microtome diamond knife. A polymer film having an exposed cross-section was immersed in monomethylamine at room temperature (25° C.) for 4 hours, distilled water was added dropwise to the cross-section to wash the polymer film, and the water droplets were removed with an air duster. Thereafter, a cross-section of the polymer film was imaged using a scanning electron microscope (SEM) ("S-4800 type" manufactured by Hitachi High-Tech Fielding Corporation) at an acceleration voltage of 2 kV and a magnification of 3,000 times.

The captured image was binarized using a Threshold function of an image processing software "ImageJ", and the image was divided into a dark portion and a bright portion to obtain image processing data. A threshold value in the binarization was automatically determined by image processing software between 88 and 105 of 256 gradations according to a contrast of the captured image. A range of the captured image was 15 μm in the thickness direction×42 μm in the transport direction. The dark portion in the binarized image processing data corresponds to a void region of the polymer film.

An area of the dark portion was automatically detected and measured from the binarized image processing data, and an area of each void region was determined from the obtained measured value while an average area of the void regions was determined.

A position at a distance of 1/10 of a thickness of the polymer was defined as a position T1, a position at a distance of 4/10 of the thickness of the polymer film was defined as a position T2, and a position at a distance of 6/10 of the thickness of the polymer film was defined as a position T3, each from one surface toward the other surface of the polymer film; a region from the one surface to the position T1 was defined as a first surface layer region and a region from the position T2 to the position T3 was defined as a central region; binarized data were obtained from the captured image with n=2; and thus, a void area proportion X which is a void area proportion in the first surface layer region, and a void area proportion Y which is a void area proportion in the central region were calculated. Each void area proportion means a proportion (%) of the area of a void in each region with respect to the area of each region of the cross-section of the polymer film.

The values of "Void area proportion Y−Void area proportion X" (described as (Y−X) in the table) are shown in Table 1 which will be described later.

Hardness

A hardness of the polymer film produced in each example was measured by the following method.

The polymer film produced in each example was embedded with an epoxy resin, cut along the thickness direction of the embedded polymer film, and the exposed cross-section was ground with a microtome to obtain a cut surface for measurement. In the obtained cut surface, a hardness A at a position A at a distance of half of a thickness of the polymer film from one surface toward the other surface of the polymer film and a hardness B at a position B at a distance of 1/10 of the thickness of the polymer film from the one surface toward the other surface of the polymer film in a cross-section along a thickness direction of the polymer film were measured by a nanoindentation method.

The measurement was performed according to ISO14577, specifically by TI-950 (Nanotriboindenter) (manufactured by Bruker Japan Co., Ltd.) using a Belkovic indenter, the measurements were performed at six points for each position under the condition of an indentation load of 500 μN, and an arithmetic mean value of the six points was defined as hardness (unit: GPa).

The values of "(Hardness A+Hardness B)/2" (described as (A+B)/2 in the table) and the values of "Hardness A−Hardness B" (described as (A−B) in the table) are each shown in Table 1 which will be described later.

Dielectric Characteristics

Using a sample cut out so as to include an entire thickness direction of the polymer film produced in each example, the dielectric loss tangent in a frequency band of 28 GHz was measured in an environment at a temperature of 23° C. and a humidity of 65% RH, using a split cylinder type resonator ("CR-728" manufactured by Kanto Electronics Application & Development, Inc.) and a network analyzer (Keysight N5230A). Evaluation was made according to the following standard, based on the measured values of the dielectric loss tangent.

A: The dielectric loss tangent is 0.0021 or less.
B: The dielectric loss tangent is more than 0.0021 and 0.0024 or less.
C: The dielectric loss tangent is more than 0.0024.

Thermal Characteristics

A linear expansion coefficient of the polymer film produced in each example was measured by the following method.

A sample with a width of 6 mm and a length of 6 mm was cut from the center portion of the polymer film produced in each example, the sample was placed on a sample stage of a thermomechanical analyzer ("TMA-Q400" manufactured by TA Instruments Japan), and then an in-plane linear expansion coefficient (CTE) of the polymer film was measured. Evaluation was made according to the following standard, based on the measured values of the linear expansion coefficient. Incidentally, the linear expansion coefficient of copper is 18 ppm/° C.

A: The linear expansion coefficient is 17 to 19 ppm/° C.
B: The linear expansion coefficient is more than 19 ppm/° C. and 23 ppm/° C. or less, or 13 ppm/° C. or more and less than 17 ppm/° C.
C: The linear expansion coefficient is more than 23 ppm/° C., or less than 13 ppm/° C.

Results

The production conditions and characteristics of the polymer film, the production conditions of the metal-clad laminate, and the evaluation results for each Example and each Comparative Example are shown in Table 1 below.

The types and the melting points (unit: ° C.) of the resins (liquid crystal polymers) used in the production of the polymer film in each example are shown in the "Resin" column in Table 1.

The methods and the conditions for the specific heat treatment and the annealing treatment in the step A are shown in the "Production of polymer film" column in Table 1.

TABLE 1

| | Resin | | Production of polymer film | | | | Production of metal-clad laminate | | | | Characteristics of polymer film | | | | | | | |
|---|---|---|---|---|---|---|---|---|---|---|---|---|---|---|---|---|---|---|
| | | Melting point (° C.) | Production conditions | Heating (° C.) | Cooling (° C./sec) | Annealing Conditions | Metal foil | Adhesive layer | Sticking (both sides) | Thickness μm | Void area proportion (Y − X) % | Hardness (A + B)/2 GPa | (A − B) GPa | Dielectric characteristics Dielectric loss tangent Evaluation | Value | Thermal characteristics Linear expansion coefficient Evaluation | Value (ppm/° C.) |
| | Type | | | | | | | | | | | | | | | | |
| Example 1 | LCP1 | 280 | Heating + Cooling | 290 | −50 | 270° C. × 10 hours | Copper foil 1 | Absent | Thermal press 260° C. | 50 | 0.10 | 0.17 | 0.010 | A | 0.0021 | A | 17 |
| Example 2 | LCP1 | 280 | Heating + Cooling | 290 | −50 | 300° C. × 10 seconds | Copper foil 2 | Absent | Thermal press 260° C. | 50 | 0.50 | 0.15 | 0.020 | B | 0.0024 | B | 22 |
| Example 3 | LCP1 | 280 | Heating + Cooling | 290 | −50 | 300° C. × 1 hour | Copper foil 1 | Absent | Thermal press 260° C. | 50 | 0.20 | 0.16 | 0.020 | B | 0.0022 | A | 18 |
| Example 4 | LCP1 | 280 | Heating + Cooling | 290 | −50 | 300° C. × 1 hour (press performed) | Copper foil 1 | Absent | Thermal press 260° C. | 50 | 0.30 | 0.15 | 0.010 | B | 0.0023 | B | 20 |
| Example 5 | LCP1 | 280 | Heating + Cooling | 290 | −50 | 270° C. × 10 hours | Copper foil 2 | Absent | Thermal press 260° C. | 50 | 0.10 | 0.17 | 0.010 | A | 0.0021 | A | 17 |
| Example 6 | LCP1 | 280 | Heating + Cooling | 290 | −50 | 270° C. × 10 hours | Copper foil 1 | Present | Thermal press 260° C. | 50 | 0.10 | 0.17 | 0.010 | B | 0.0022 | A | 17 |
| Example 7 | LCP1 | 280 | Heating + Cooling | 290 | −50 | 300° C. × 1 hour | Copper foil 1 | Present | Thermal press 260° C. | 50 | 0.20 | 0.16 | 0.010 | B | 0.0023 | A | 18 |
| Example 8 | LCP1 | 280 | Heating + Cooling | 290 | −50 | 300° C. × 1 hour (press performed) | Copper foil 1 | Present | Thermal press 260° C. | 50 | 0.30 | 0.15 | 0.010 | B | 0.0023 | B | 20 |
| Example 9 | LCP2 | 320 | Heating + Cooling | 330 | −50 | 300° C. × 10 seconds | Copper foil 1 | Absent | Thermal press 290° C. | 50 | 0.40 | 0.16 | 0.020 | B | 0.0024 | A | 18 |
| Comparative Example 1 | LCP1 | 280 | — | — | — | — | Copper foil 2 | Absent | Thermal press 260° C. | 50 | 0.00 | 0.08 | 0.005 | C | 0.0025 | C | 28 |
| Comparative Example 2 | LCP1 | 280 | — | — | — | 270° C. × 1 hour | Copper foil 2 | Absent | Thermal press 260° C. | 50 | 0.05 | 0.14 | 0.005 | B | 0.0024 | C | 24 |

From the results shown in the tables, it was confirmed that the objects of the present invention can be accomplished with the polymer film of the embodiment of the present invention.

EXPLANATION OF REFERENCES

10: film forming device
12: annular die
14: cooling blower
16: heater
18: cooler

What is claimed is:

1. A polymer film comprising a liquid crystal polymer, wherein a hardness at a position A at a distance of half of a thickness of the polymer film from one surface toward the other surface of the polymer film is defined as a hardness A and a hardness at a position B at a distance of 1/10 of the thickness of the polymer film from the one surface toward the other surface of the polymer film is defined as a hardness B in a cross-section along a thickness direction of the polymer film, the hardness A and the hardness B satisfy a relationship of Expression (1A), and
wherein a position at a distance of 1/10 of the thickness of the polymer film is defined as a position T1, a position at a distance of 4/10 of the thickness of the polymer film is defined as a position T2, and a position at a distance of 6/10 of the thickness of the polymer film is defined as a position T3, from the one surface toward the other surface of the polymer film in the cross-section; a region from the one surface to the position T1 is defined as a first surface layer region, and a region from the position T2 to the position T3 is defined as a central region; and a void area proportion in the first surface layer region is defined as a void area proportion X, and a void area proportion in the central region is a void area proportion Y, the void area proportion X and the void area proportion Y satisfy a relationship of Expression (2A), $$(\text{Hardness } A + \text{Hardness } B)/2 > 0.10 \text{ GPa} \qquad \text{Expression (1A):}$$

$$\text{Void area proportion } Y - \text{Void area proportion } X \geq 0.10\%, \qquad \text{Expression (2A):}$$

wherein the liquid crystal polymer has at least one selected from the group consisting of a repeating unit derived from parahydroxybenzoic acid and a repeating unit derived from 6-hydroxy-2-naphthoic acid, and
wherein the polymer film has a monolayer structure.

2. The polymer film according to claim 1, wherein the hardness A and the hardness B satisfy a relationship of Expression (1B), $$(\text{Hardness } A - \text{Hardness } B) > -0.02 \text{ GPa}. \qquad \text{Expression (1B):}$$

3. The polymer film according to claim 2, wherein the polymer film has a dielectric loss tangent of 0.0024 or less at a temperature of 23° C. and a frequency of 28 GHz.

4. A laminate comprising:
the polymer film according to claim 2; and
at least one metal-containing layer.

5. The polymer film according to claim 1, wherein the polymer film has a dielectric loss tangent of 0.0024 or less at a temperature of 23° C. and a frequency of 28 GHz.

6. A laminate comprising:
the polymer film according to claim 1; and
at least one metal-containing layer.

7. The laminate according to claim 6,
wherein the laminate has at least two of the metal-containing layers, and
the metal-containing layer, the polymer film, and the metal-containing layer are arranged in this order.

8. The laminate according to claim 6,
wherein the metal-containing layer has a thickness of 5 to 30 μm.

* * * * *